US011216177B2

(12) United States Patent
Seomoon et al.

(10) Patent No.: US 11,216,177 B2
(45) Date of Patent: Jan. 4, 2022

(54) ELECTRONIC DEVICE

(71) Applicant: SAMSUNG DISPLAY CO., LTD., Yongin-si (KR)

(72) Inventors: Hee Seomoon, Hwaseong-si (KR); Won Ki Hong, Suwon-si (KR); Sung Kook Park, Suwon-si (KR); Tae Hee Lee, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/401,245

(22) Filed: May 2, 2019

(65) Prior Publication Data

US 2020/0026422 A1  Jan. 23, 2020

(30) Foreign Application Priority Data

Jul. 17, 2018  (KR) .................. 10-2018-0082825

(51) Int. Cl.
| | |
|---|---|
| *G06F 3/041* | (2006.01) |
| *G06F 3/0488* | (2013.01) |
| *G06F 3/01* | (2006.01) |
| *G06F 3/0482* | (2013.01) |

(52) U.S. Cl.
CPC .......... *G06F 3/04883* (2013.01); *G06F 3/016* (2013.01); *G06F 3/041* (2013.01); *G06F 3/0482* (2013.01); *G06F 2203/04105* (2013.01)

(58) Field of Classification Search
CPC ...... G06F 3/04883; G06F 3/016; G06F 3/041; G06F 2203/0339; G06F 2203/04105; G06F 3/0482; G06F 3/04842; G06F 3/0488
See application file for complete search history.

(56) References Cited

U.S. PATENT DOCUMENTS

| | | | |
|---|---|---|---|
| 7,538,760 | B2 | 5/2009 | Hotelling et al. |
| 8,654,524 | B2 | 2/2014 | Pance et al. |
| 8,686,952 | B2 | 4/2014 | Burrough et al. |
| 8,723,824 | B2 | 5/2014 | Myers et al. |
| 8,749,510 | B2 * | 6/2014 | Park ...................... G06F 3/0488 345/173 |
| 8,787,006 | B2 | 7/2014 | Golko et al. |
| 8,976,141 | B2 | 3/2015 | Myers et al. |

(Continued)

FOREIGN PATENT DOCUMENTS

| | | |
|---|---|---|
| KR | 10-2014-0000932 | 1/2014 |
| KR | 10-1679561 | 11/2016 |

(Continued)

*Primary Examiner* — Insa Sadio

(74) *Attorney, Agent, or Firm* — F. Chau & Associates, LLC

(57) ABSTRACT

An electronic device comprises a touch display that includes an edge portion on at least one side thereof, a sensor unit that includes a first pressure sensor disposed in a first sensing area of the edge portion and a second pressure sensor disposed in a second sensing area of the edge portion, and a control unit that displays a first user interface on the touch display in response to a first input signal that exceeds a predetermined pressure value being detected via at least one of the first or second pressure sensors and that performs a first action in response to a second input signal that exceeds a predetermined pressure value being detected via at least one of the first or second pressure sensors.

17 Claims, 22 Drawing Sheets

(56) References Cited

U.S. PATENT DOCUMENTS

| | | | |
|---|---|---|---|
| 9,019,170 B2* | 4/2015 | Kim | G06F 1/1652 |
| | | | 345/1.1 |
| 9,411,451 B2 | 8/2016 | Myers et al. | |
| 9,651,989 B2* | 5/2017 | Kim | G06F 3/0487 |
| 9,766,743 B2* | 9/2017 | Jung | G06F 3/0416 |
| 9,791,949 B2 | 10/2017 | Myers et al. | |
| 10,067,666 B2* | 9/2018 | Kim | G06F 1/1652 |
| 10,318,034 B1* | 6/2019 | Hauenstein | G06F 3/0486 |
| 10,539,979 B2* | 1/2020 | Ha | G06F 3/0416 |
| 2006/0197753 A1* | 9/2006 | Hotelling | G06F 1/169 |
| | | | 345/173 |
| 2010/0026656 A1* | 2/2010 | Hotelling | G06F 3/044 |
| | | | 345/174 |
| 2010/0123675 A1* | 5/2010 | Ippei | G06F 3/044 |
| | | | 345/173 |
| 2010/0134423 A1* | 6/2010 | Brisebois | G06F 3/03547 |
| | | | 345/173 |
| 2011/0122078 A1* | 5/2011 | Kasahara | G06F 3/0488 |
| | | | 345/173 |
| 2012/0217145 A1* | 8/2012 | Yi | G06F 3/044 |
| | | | 200/5 A |
| 2013/0076649 A1* | 3/2013 | Myers | G06F 3/04886 |
| | | | 345/173 |
| 2013/0082945 A1* | 4/2013 | Jo | H04M 1/67 |
| | | | 345/173 |
| 2013/0176236 A1* | 7/2013 | Ivanov | G06F 3/044 |
| | | | 345/173 |
| 2013/0300697 A1* | 11/2013 | Kim | G06F 1/1626 |
| | | | 345/173 |
| 2013/0307816 A1* | 11/2013 | Lee | G06F 1/1652 |
| | | | 345/174 |
| 2014/0028575 A1 | 1/2014 | Parivar et al. | |
| 2014/0085213 A1 | 3/2014 | Huppi et al. | |
| 2014/0091857 A1 | 4/2014 | Bernstein | |
| 2014/0092064 A1 | 4/2014 | Bernstein et al. | |
| 2014/0189523 A1* | 7/2014 | Shuttleworth | G06F 3/0481 |
| | | | 715/741 |
| 2014/0240289 A1* | 8/2014 | Myers | G06F 3/041 |
| | | | 345/174 |
| 2014/0253477 A1* | 9/2014 | Shim | G06F 3/0487 |
| | | | 345/173 |
| 2014/0293145 A1 | 10/2014 | Jones et al. | |
| 2014/0347309 A1* | 11/2014 | Mockarram-Dorri | |
| | | | G01R 27/2605 |
| | | | 345/174 |
| 2015/0248200 A1* | 9/2015 | Cho | G06F 3/0482 |
| | | | 715/773 |
| 2015/0324056 A1* | 11/2015 | Sato | G06F 3/0416 |
| | | | 345/174 |
| 2015/0338988 A1* | 11/2015 | Lee | G06F 1/1613 |
| | | | 345/173 |
| 2015/0339804 A1* | 11/2015 | Kim | G06T 3/60 |
| | | | 345/659 |
| 2016/0110093 A1* | 4/2016 | S | G06F 3/04886 |
| | | | 715/863 |
| 2016/0147375 A1* | 5/2016 | Bok | G06F 3/0421 |
| | | | 345/175 |
| 2016/0188197 A1* | 6/2016 | Ryu | G06F 1/1694 |
| | | | 345/156 |
| 2016/0202869 A1* | 7/2016 | Kim | G06F 3/0488 |
| | | | 715/841 |
| 2016/0259413 A1* | 9/2016 | Anzures | G06T 13/80 |
| 2017/0003874 A1* | 1/2017 | Grupinski | G06F 1/1647 |
| 2017/0031514 A1* | 2/2017 | Kimura | G06F 3/0412 |
| 2017/0131811 A1* | 5/2017 | Watanabe | G06F 3/044 |
| 2017/0287992 A1* | 10/2017 | Kwak | H04M 1/0264 |
| 2017/0308200 A1* | 10/2017 | Mugiraneza | H03K 17/962 |
| 2018/0052540 A1 | 2/2018 | Myers et al. | |
| 2018/0143669 A1* | 5/2018 | Bok | G06F 3/0412 |
| 2018/0199110 A1* | 7/2018 | Cormican | H04N 21/482 |
| 2018/0224963 A1* | 8/2018 | Lee | G06F 3/0488 |
| 2018/0292938 A1* | 10/2018 | Karlo | G06F 3/0414 |
| 2018/0314362 A1* | 11/2018 | Kim | G06F 3/04886 |
| 2019/0114021 A1* | 4/2019 | Oliver | G06F 3/0418 |
| 2020/0042125 A1* | 2/2020 | Lee | G06F 3/0488 |

FOREIGN PATENT DOCUMENTS

| | | |
|---|---|---|
| KR | 10-1768540 | 8/2017 |
| KR | 10-2018-0028857 | 3/2018 |

* cited by examiner

ELECTRONIC DEVICE

This application claims priority under 35 U.S.C. § 119 from, and the benefit of, Korean Patent Application No. 10-2018-0082825, filed on Jul. 17, 2018 in the Korean Intellectual Property Office, the contents of which are herein incorporated by reference in their entirety.

BACKGROUND

1. Technical Field

Embodiments of the present disclosure are directed to an electronic device that includes a display.

2. Discussion of the Related Art

Electronic devices provide various input methods for various user functions. For example, a conventional electronic device provides a touch screen that includes a touch panel and a display unit, and can process an action performed by a user to choose a particular image to be displayed on the display unit.

Recently, electronic devices that include an edge display unit obtained by expanding the display unit of an existing electronic device and that can be carried around and provide a relatively large screen, have been manufactured and made available on the market.

SUMMARY

Exemplary embodiments of the present disclosure provide an electronic device that can be intuitively manipulated using pressure sensors mounted in edge areas of a display unit thereof.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment of the present disclosure, an electronic device includes a touch display that includes an edge portion on at least one side thereof; a sensor unit that includes a first pressure sensor disposed in a first sensing area of the edge portion and a second pressure sensor disposed in a second sensing area of the edge portion; and a control unit that displays a first user interface on the touch display in response to a first input signal that exceeds a predetermined pressure value being detected via at least one of the first or second pressure sensors and that performs a first action in response to a second input signal that exceeds a predetermined pressure value being detected via at least one of the first or second pressure sensors.

The touch display may include the edge portion on both sides thereof.

The first pressure sensor may be disposed as at least two pairs of segments that face the first sensing area, and the second pressure sensor is disposed as at least one pair of segments that face the second sensing area.

A length of the segments disposed in the second sensing area may be greater than a length of the segments disposed in the first sensing area.

The control unit may display a plurality of items in the first sensing area, and the items may overlap the segments disposed in the first sensing area.

The electronic device may further comprise a haptic module.

The control unit may provide a predetermined vibration in response to pressure that exceeds a predetermined level being applied to the items in the first sensing area.

Each of the plurality of items may correspond to an application that is executable.

The control unit may determine items to be displayed in at least one of the first or second sensing areas in response to an input from a user.

Each of the first and second input signals may be one of a tap, a swipe, or a squeeze performed on the edge portion.

The first user interface may be an application execution screen for at least one of a camera application, a phone application, an email application, a messages application, a music an player application, a video player application, an alarm setting application, a flashlight application, or an Internet browser application.

The first user interface may include a menu.

The first action may be one of a click, a drag, or a scroll for executing an action associated with an item of the menu.

When the first input signal exceeds a predetermined duration threshold value, the control unit may display a second user interface on the touch display.

The touch display may further include a main area on a front surface thereof, and the surface that includes the edge portion and the surface that includes the main area may form an obtuse angle with each other.

The electronic device may further comprise a motion sensing unit.

The control unit may determine whether the electronic device is in a portrait view mode or in a landscape view mode via the motion sensing unit and displays the first user interface on the touch display in different orientations depending on the view mode of the electronic device, in response to the first input signal being detected by the sensor unit.

According to another exemplary embodiment of the invention, an electronic device includes a touch display that includes an edge portion on both sides thereof, a sensor unit that includes a first pressure sensor disposed in a first sensing area of the edge portion and a second pressure sensor disposed in a second sensing area of the edge portion, and a control unit that displays a first user interface on the touch display in response to a first input signal that exceeds a predetermined pressure value and a second input signal that exceeds the predetermined pressure value being detected at the same time via the first and second pressure sensors, respectively, and that performs a first action in response to a third input signal that exceeds the predetermined pressure value being detected via at least one of the first or second pressure sensors.

The first pressure sensor may be disposed as at least two pairs of segments that face the first sensing area, and the second pressure sensor may be disposed as at least one pair of segments that face the second sensing area.

A length of the segments disposed in the second sensing area may be greater than a length of the segments disposed in the first sensing area.

The control unit may display a plurality of items in at least one of the first or second sensing areas, and the items may overlap the segments disposed in the first sensing area or the segments disposed in the second sensing area.

According to another exemplary embodiment of the invention, an electronic device includes a storage unit, a touch display that includes an edge portion on both sides thereof, a sensor unit that includes a first pressure sensor disposed in a first sensing area of the edge portion and a second pressure sensor disposed in a second sensing area of the edge portion, and a control unit that searches for and finds a first user interface that corresponds to a number of times a first input signal that exceeds a predetermined pressure value is detected by the sensor unit and that displays the first user interface in response to the first input signal being detected by the sensor unit, and that performs a first action in response to a second input signal that exceeds the predetermined pressure value being detected via at least one of the first or second pressure sensors.

The first pressure sensor may be disposed as at least two pairs of segments that face the first sensing area, and the second pressure sensor may be disposed as at least one pair of segments that face the second sensing area.

A length of the segments disposed in the second sensing area may be greater than a length of the segments disposed in the first sensing area.

The control unit may display a plurality of items in at least one of the first or second sensing areas, and the items may overlap the segments disposed in the first sensing area or the segments disposed in the second sensing area.

According to exemplary embodiments of the present disclosure, the functions of an electronic device can be controlled using pressure sensors. Accordingly, user convenience and satisfaction can be improved.

In addition, malfunction of an electronic device that includes an edge display unit can be prevented.

DETAILED DESCRIPTION

Embodiments of the present disclosure will now be described more fully hereinafter with reference to the accompanying drawings, in which exemplary embodiments of the disclosure are shown. Embodiments may take different forms and should not be construed as limited to the exemplary embodiments set forth herein.

Description will now be given in detail according to exemplary embodiments disclosed herein, with reference to the accompanying drawings. For the sake of brevity of description with reference to the drawings, the same or equivalent components may be provided with the same or similar reference numbers, and description thereof will not be repeated.

Hereinafter, for convenience of description, the electronic device is assumed to be a mobile terminal.

Figure 1:
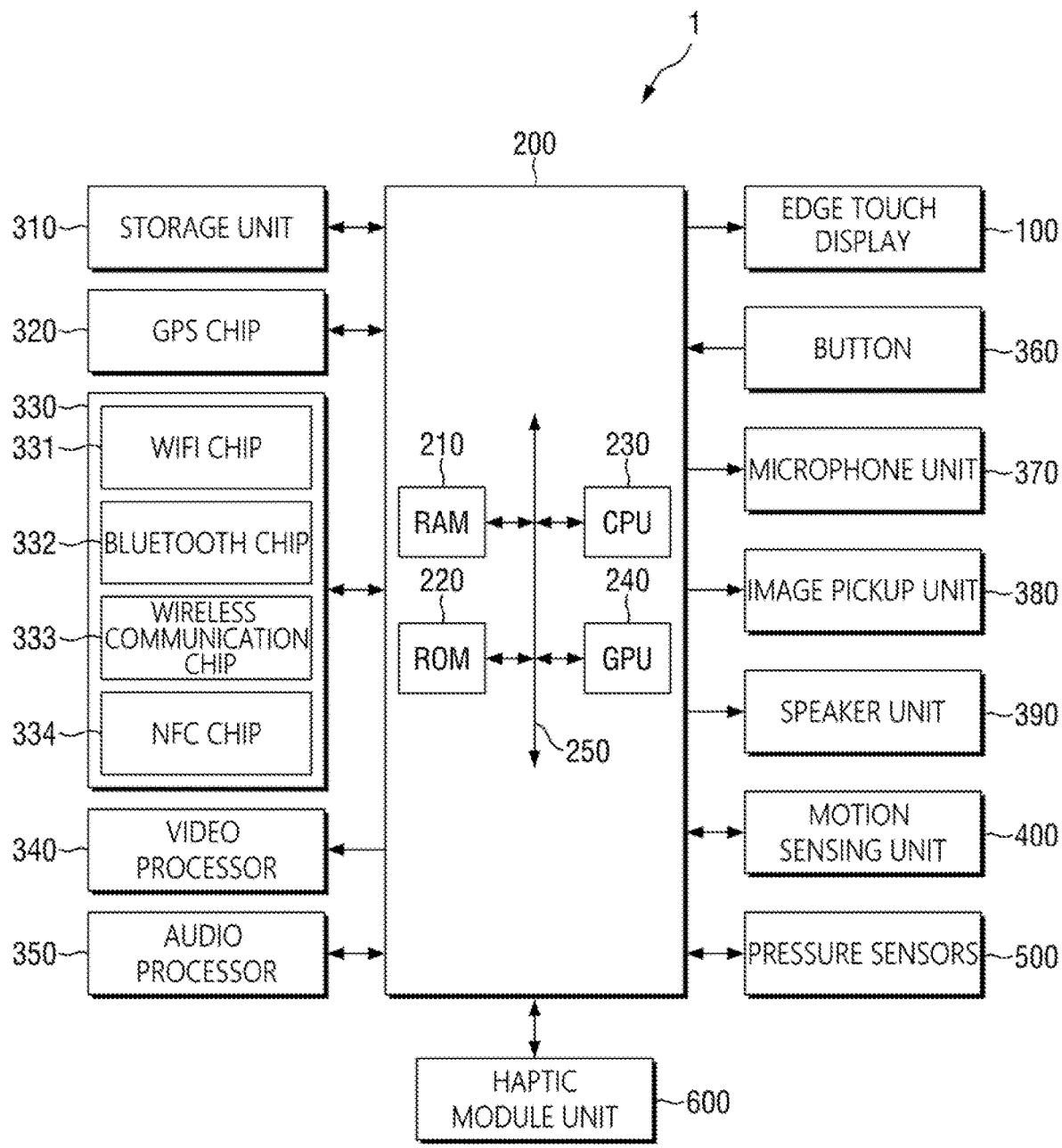
FIG. 1 is a block diagram of a mobile terminal according to an exemplary embodiment of the present disclosure.

FIG. 1 is a block diagram of a mobile terminal according to an exemplary embodiment of the present disclosure.

The term "mobile terminal", as used herein, may include a mobile phone, a smartphone, a laptop computer, a digital broadcasting terminal, a personal digital assistant (PDA), a portable multimedia player (PMP), or a navigation device. However, the inventive concept of the present disclosure may also be incorporated into a stationary terminal such as a digital TV, a desktop computer, etc.

Referring to FIG. 1, according to an embodiment, a mobile terminal 1 includes an edge touch display 100, a control unit 200, a storage unit 310, a global positioning system (GPS) chip 320, a communication unit 330, a video processor 340, an audio processor 350, a button 360, a microphone unit 370, an image pickup unit 380, a speaker unit 390, a motion sensing unit 400, pressure sensors 500, and a haptic module unit 600.

According to an embodiment, the edge touch display 100 is divided into a main 24 area and one or more edge areas. The edge touch display 100 can be incorporated into various types of displays, such as a liquid crystal display (LCD), an organic light-emitting diode (OLED) display, a plasma display panel (PDP), etc. The edge touch display 100 includes driving circuits, which may be implemented as an a-Si thin-film transistor (TFT), a low-temperature polysilicon (LTPS) TFT, an organic TFT (OTFTs), etc., or a backlight unit. The edge touch display 100 can also be incorporated into a flexible display or a non-flexible or rigid display. In a case where the touch display 100 is implemented as a rigid display, the edge touch display is formed by connecting multiple general displays together.

According to an embodiment, the edge touch display 100 includes a touch sensor that can sense a user's touch gesture. The touch sensor can be implemented as, for example, an electrostatic touch sensor, a pressure-sensitive touch sensor, or a piezoelectric touch sensor. An electrostatic touch sensor, which uses a dielectric material coated on the surface of a touch screen, detects minute electricity generated by a user's body when a part of the user's body touches the surface of a touch screen and thereby calculates touch coordinates. A pressure-sensitive touch sensor includes two electrode plates embedded in a touch screen. When a user touches the touch screen, the two electrode plates come into contact with each other at a point touched on by the user to generate a current, and the pressure-sensitive touch sensor calculates touch coordinates by detecting the current. When the mobile terminal 1 supports a pen input function, the edge touch display 100 can detect a user gesture made not only with a user's finger, but also with an input means such as a pen. If the input means is a stylus pen that includes a coil therein, the mobile terminal 1 includes a magnetic field sensor that can detect a magnetic field changed by the coil of the stylus pen. Accordingly, the mobile terminal 1 can detect not only a touch gesture, but also, a proximity gesture such as hovering.

According to an embodiment, the storage unit 310 can store various programs and data necessary for an action of the mobile terminal 1. Specifically, the storage unit 310 can store programs and data that form various screens to be displayed in the main area and the edge areas of the edge touch display 100.

According to an embodiment, the control unit 200 displays content in the main area and in the edge areas using the programs and data stored in the storage unit 310. When the main area, the edge areas, or the boundaries between the main area and the edge areas are touched by the user, the control unit 200 performs a control action that corresponds to whichever of the main area, the edge areas, or the boundaries are touched by the user.

According to an embodiment, the control unit 200 includes a random access memory (RAM) 210, a read-only memory (ROM) 220, a central processing unit (CPU) 230, and a graphic processing unit (GPU) 240. The RAM 210, the ROM 220, the CPU 230, and the so GPU 240 may be connected to one another via a bus 250.

According to an embodiment, the CPU 230 accesses the storage unit 310 to boot the mobile terminal 1 using an operating system (OS) stored in the storage unit 310. The CPU 230 performs various operations using the programs, content, and data stored in the storage unit 310.

In the ROM 220, according to an embodiment, an instruction set for booting the mobile terminal 1 is stored. In response to a turn-on instruction being received and power being supplied, the CPU 230 copies the OS from the storage unit 310 to the RAM 210 and boots the mobile terminal 1 by executing the copied OS. Once the mobile terminal 1 has booted up, the CPU 230 copies the programs from the storage unit 310 to the RAM 210 and performs various operations by executing the copied programs. Once the mobile terminal 1 has booted up, the GPU 240 displays a user interface (UI) screen in whichever of the main area and the edge areas are activated. Specifically, the GPU 240 creates a screen that includes various objects, such as icons, images, or text using a calculator and a renderer. The calculator calculates the coordinates at which each object is to be displayed and the attributes of each object, such as shape, size, or color. The renderer creates a screen that includes the objects in various layouts based on the attributes calculated by the renderer. The screen created by the renderer is provided to the edge touch display 100 and is displayed in the main and edge areas.

According to an embodiment, the GPS chip 320 receives a GPS signal from a GPS satellite and calculates the current location of the mobile terminal 1 based on the received GPS signal. The control unit 200 calculates the location of the user using the GPS chip 320 when a navigation program is in use or the current location of the user is needed.

According to an embodiment, the communication unit 330 communicates with various types of external devices using various communication protocols. The communication unit 330 includes a WiFi chip 331, a Bluetooth chip 332, a wireless communication chip 333, and a near field communication (NFC) chip 334. The control unit 200 communicates with various external devices using the communication unit 330.

According to an embodiment, the WiFi chip 331 and the Bluetooth chip 332 perform communication using a WiFi protocol and a Bluetooth protocol, respectively. When the WiFi chip 331 or the Bluetooth chip 332 is used, various connection information, such as a service set identifier (SSID) and a session key, are transmitted first. Then, a communication connection is established using the connection information, and various data can be transmitted via the communication connection. The wireless communication chip 333 performs communication in accordance with various communication standards, such as IEEE, ZigBee, 3rd Generation (3G), 3rd Generation Partnership Project (3GPP), or Long Term Evolution (LTE). The NFC chip 334 operates in an NFC protocol using a 13.56 MHz frequency band, among other radio-frequency identification (RFID) frequency bands, such as 135 KHz, 433 MHz, 860 MHz to 960 MHz, or 2.45 GHz.

According to an embodiment, the video processor 340 processes video data included in content received via the communication unit 330 or video data included in the content stored in the storage unit 310. The video processor 340 performs various operations, such as decoding, scaling, noise filtering, frame rate conversion, or resolution conversion, on video data.

According to an embodiment, the audio processor 350 processes audio data included in the content received via the communication unit 330 or audio data included in the content stored in the storage unit 310. The audio processor 350 performs various operations, such as decoding, amplification, or noise filtering, on audio data.

According to an embodiment, in response to a multimedia content player program being executed, the control unit 200 reproduces multimedia content by driving the video processor 340 and the audio processor 350.

According to an embodiment, the edge touch display 100 displays image frames generated by the video processor 340 in the main area, the edge areas, or both.

According to an embodiment, the speaker unit 390 outputs audio data generated by the audio processor 350.

According to an embodiment, the button 360 can be placed at an arbitrary region at the front, side, or rear of the exterior of the mobile terminal 1 in various forms, such as a mechanical button, a touch pad, a wheel, etc.

According to an embodiment, the microphone unit 370 receives the voice of a user or other sounds and converts them into audio data. The control unit 200 uses the user's voice, received by the microphone unit 370, during a call or converts the received user's voice into audio data and stores the audio data in the storage unit 310.

According to an embodiment, the image pickup unit 380 picks up a still image or a moving image under control of a user. The image pickup unit 380 can be implemented as multiple cameras such as front and rear cameras. The image pickup unit 380 is used to capture a user's image to track the user's gaze.

When the image pickup unit 380 and the microphone unit 370 are provided, the control unit 200 performs control operations in accordance with the user's voice, received by the microphone unit 370, or a user's motion, recognized by the image pickup unit 380. That is, the mobile terminal 1 may operate in a motion control mode or a voice control mode. When the mobile terminal 1 operates in motion control mode, the control unit 200 captures a user's image by activating the image pickup unit 380, tracks a change in the user's motion, and performs a control operation based on the tracking result. When the mobile terminal 1 operates in voice control mode, the control unit 200 analyzes the user's voice of the user received by the microphone unit 370, and performs a control operation based on the analysis result.

According to an embodiment, a mobile terminal that supports both motion control mode and voice control mode can be used in various exemplary embodiments where voice recognition technology or motion recognition technology is used. For example, when a user makes a motion to select an object displayed on a home screen or utters a voice command corresponding to the object, a determination is made that the object is selected, and a control operation that corresponds to the object may be performed.

According to an embodiment, the motion sensing unit 400 detects movement of the main body of the mobile terminal 1. The mobile terminal 1 may be rotated or tilted in various directions. The motion sensing unit 400 detects the motion characteristics of the mobile terminal 1, such as rotation direction and angle and tilt, using at least one of a variety of sensors such as a geomagnetic sensor, a gyro sensor, an acceleration sensor, etc.

According to an embodiment, the pressure sensors 500 detect pressure applied to the edge areas of the mobile terminal 1.

According to an embodiment, a haptic module 600 generates various tactile effects that the user can sense. A representative example of a tactile effect generated by the haptic module is vibration. The intensity and the pattern of vibration generated by the haptic module can be controlled by the user or by the control unit 200. For example, different vibrations can be output after being synthesized with one another, or may be sequentially output.

According to an embodiment, the haptic module 600 generates other tactile effects besides vibration, such as a pin array moving perpendicular to a contacted skin surface, a jetting force or suction force of air through a jetting hole or suction hole, a graze against the skin surface, a contact of an electrode, an effect of stimulation by an electrostatic force, a cold or warm feeling by means of an endothermic or exothermic element, etc.

According to an embodiment, the haptic module 600 can deliver a tactile effect through direct contact and also allows a user to feel a tactile effect through kinesthesia of a user's finger or arm. Two or more haptic modules may be provided depending on the configuration of the mobile terminal 1.

According to an embodiment, the mobile terminal 1 may further include universal serial bus (USB) ports to which USB connectors can be connected, various external input ports to which various external terminals, such as a headset, a mouse, or a local area network (LAN), etc., can be connected, a digital multimedia broadcasting (DMB) chip which can receive and process DMB signals, and various sensors.

As already described above, various programs can be stored in the storage unit 310.

Figure 2:
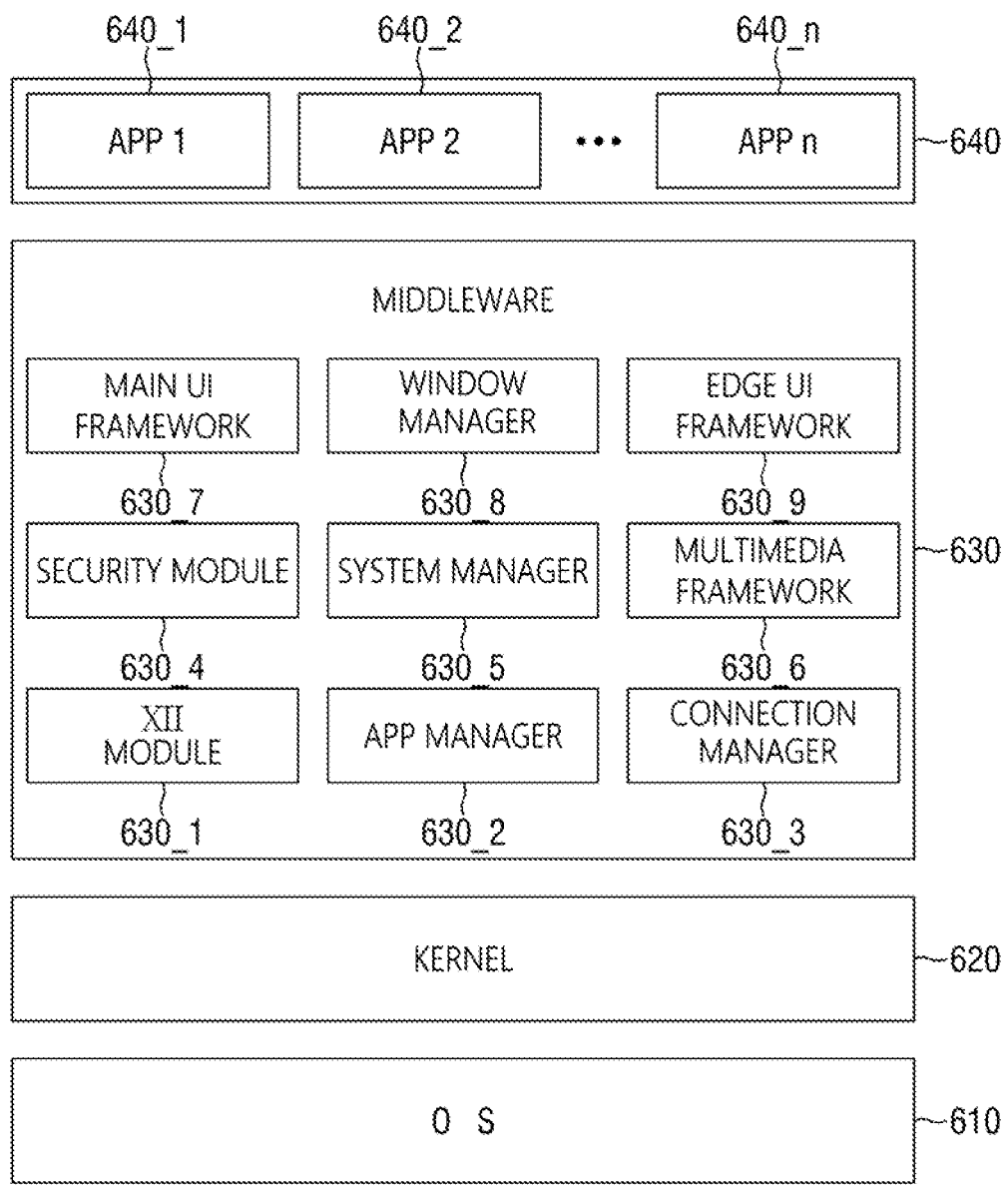
FIG. 2 is a schematic view of the configuration of software stored in a mobile terminal of FIG. 1.

FIG. 2 is a schematic view of the configuration of software stored in the mobile terminal of FIG. 1.

Referring to FIG. 2, according to an embodiment, software stored in the storage unit 310 includes an OS 610, a kernel 620, middleware 630, and a plurality of applications 640.

According to an embodiment, the OS 610 controls and manages general operations of hardware. That is, the OS 610 is a layer that performs basic functions such as hardware management, memory, and security functions.

According to an embodiment, the kernel 620 serves a passage through which various signals, such as touch signals detected from the edge touch display 100, are transmitted to the middleware 630.

According to an embodiment, the middleware 630 includes various software modules that control operations of the mobile terminal 1. Specifically, as illustrated in FIG. 2, the middleware 630 includes an XII module 630-1, an application manager 630-2, a connection manager 630-3, a security module 630-4, a system manager 630-5, a multimedia framework 630-6, a main UI framework 630-7, a window manager 630-8, and an edge UI framework 630-9.

According to an embodiment, the XII module 630-1 receives various event signals from various hardware configurations provided in the mobile terminal 1. Here, the term "event" refers to an event in which a user gesture is detected, an event in which a system alarm is generated, or an event in which a specific program is executed or has ended.

According to an embodiment, the APP manager 630-2 manages execution states of various applications 640 installed in the storage unit 310. If an application execution event is detected by the XII module 630-1, the APP manager 630-2 calls and executes an application corresponding to the particular event.

According to an embodiment, the connection manager 630-3 supports wired or wireless network connection. The connection manager 630-3 includes various modules, such as a DNET module or a universal plug and play (UPnP) module.

According to an embodiment, the security module 630-4 supports hardware certification, request permission, and secure storage.

According to an embodiment, the system manager 630-5 monitors states of the elements of the mobile terminal 1 and provides the result of the monitoring to other modules. For example, when the battery's power becomes insufficient, errors can occur, or a communication connection may become disconnected, and the system manager 630-5 provides the monitoring result to the main UI framework 630-7 or the edge UI framework 630-9 to output a notification message or notification sound.

According to an embodiment, the multimedia framework 630-6 reproduces multimedia content stored in the mobile terminal 1 or received from an external source. The multimedia framework 630-6 includes a player module, a camcorder module, and a sound processing module. Accordingly, the multimedia framework 630-6 can reproduce various multimedia content to generate a screen and sound.

According to an embodiment, the main UI framework 630-7 provides various UIs to be displayed in the main area of the edge touch display 100, and the edge UI framework 630-9 provides various UIs to be displayed in the edge areas of the edge touch display 100. Each of the main UI framework 630-7 and the edge UI framework 630-9 includes an image compositor module that configures various objects, a coordinate compositor module that calculates coordinates at which each configured object is to be displayed, a rendering module that renders each configured object at the calculated coordinates, and a 2D/3D UI tool kit that configures a 2D or 3D UI.

According to an embodiment, the window manager 630-8 detects a touch event using a user's body, a pen, or other input events. If a touch event or another input event is detected, the window manager 630-8 transmits an event signal to the main UI framework 630-7 or the edge UI framework 630-9 to perform an operation corresponding to the detected event.

In addition, according to an embodiment, various program modules, such as a handwriting module for drawing a line along a drag trace when the user touches and drags on the screen, and an angle calculation module for calculating a pitch angle, a roll angle, and a yaw angle based on sensor values detected by the motion sensing unit 400, are stored in the mobile terminal 1.

According to an embodiment, the application module 640 includes applications 640-1 to 640-*n* that support various functions. For example, the application module 640 includes program modules that provide various services, such as a navigation program module, a game module, an electronic book module, a calendar module, or an alarm management module. Such applications may be installed by default or may be optionally installed and used by the user. If an object is selected, the CPU 230 executes an application that corresponds to the selected object using the application module 640.

The software configuration of FIG. 2 is exemplary, and embodiments of the present disclosure are not limited thereto. Accordingly, some of the software of FIG. 2 may be omitted or modified, or modules than those illustrated in FIG. 2 may be added to the software of FIG. 2, as necessary. For example, various programs, such as a sensing module that analyzes signals detected by various sensors, a messaging module that includes a messenger program, a text message program, and an e-mail program, a call information aggregator program module, a VoIP module, and a web browser module, may be additionally provided in the storage unit 310.

According to an embodiment, the mobile terminal 1 can be incorporated into various devices, such as a mobile phone, a tablet PC, a laptop computer, a PDA, etc. Accordingly, the configurations illustrated in FIGS. 1 and 2 may vary depending on the type of the mobile terminal 1.

As already described above, the mobile terminal 1 can be implemented in various forms and configurations. The control unit 200 of the mobile terminal 1 can support various 34 user interactions.

A user interaction method according to an exemplary embodiment of the present disclosure will hereinafter be described.

In an exemplary embodiment, the control unit 200 receives an execution request signal that requests the execution of an application installed in the mobile terminal 1. For example, if data is received from an external device, if the user requests the execution of a particular application via the button 360 or the edge touch display 100 of the mobile terminal 1, or if the particular application is set in advance to be automatically executed at a particular time, the control unit 200 receives an execution request signal that requests the execution of the particular application.

In an exemplary embodiment, in response to an execution request signal being entered for an application, the control unit 200 selectively displays an icon of the application in a first layout or in a second layout. In the first layout, the application icon is displayed in the edge areas of the edge touch display 100, and in the second layout, the application icon is displayed in the main area of the edge touch display 100. If the mobile terminal 1 is in a first layout display mode, the control unit 200 displays the application icon in the edge areas of the edge touch display 100 in the first layout. In this case, the application icon is disposed in the entire edge areas or in parts of the edge areas. Alternatively, the application icon is disposed in both the main area and the edge areas or is displayed only partially in the edge areas.

Figure 3A:
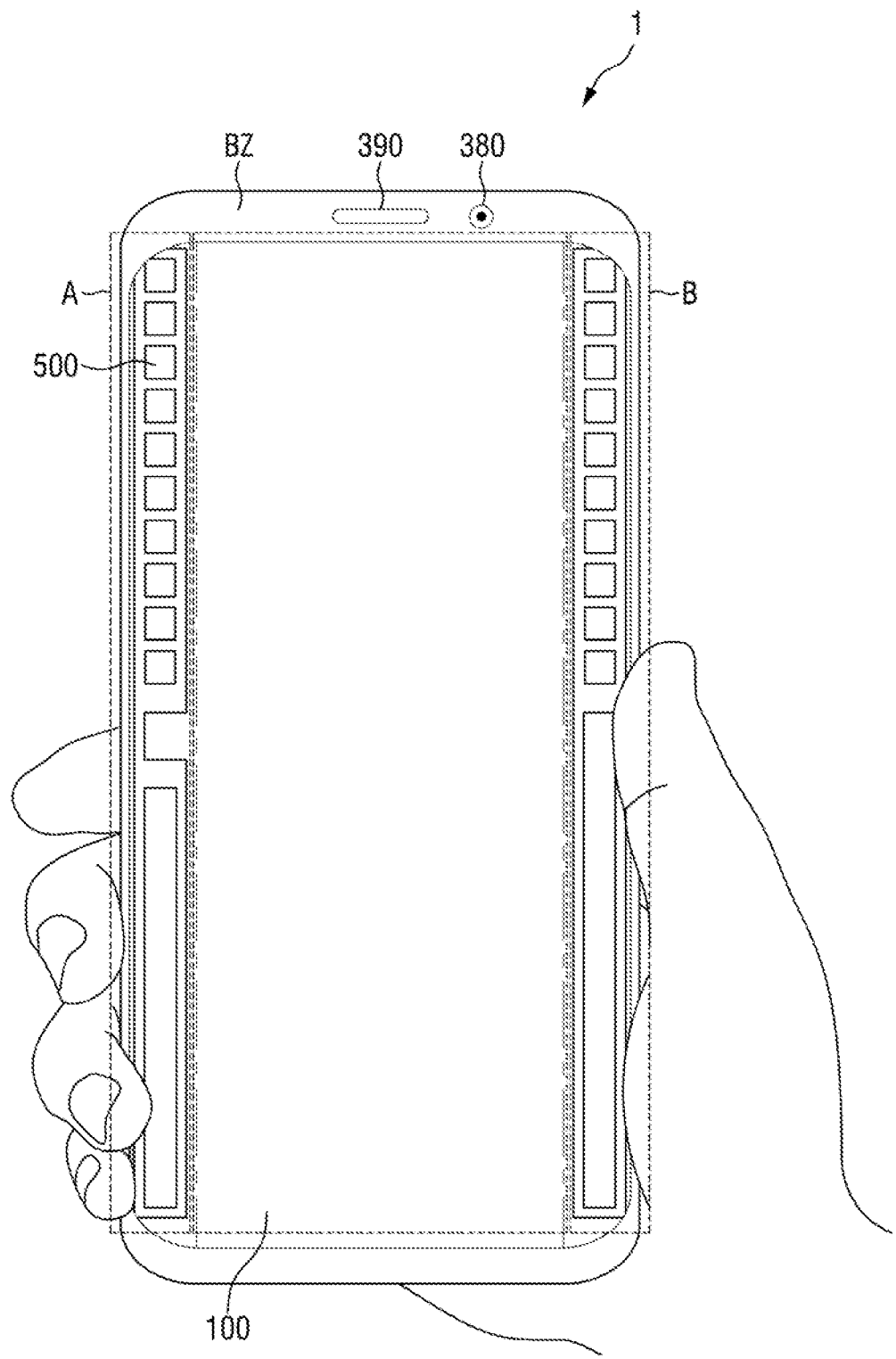
FIGS. 3A and 3B are perspective views that illustrate pressure sensors that can be mounted in a mobile terminal of FIG. 1.
Figure 3B:
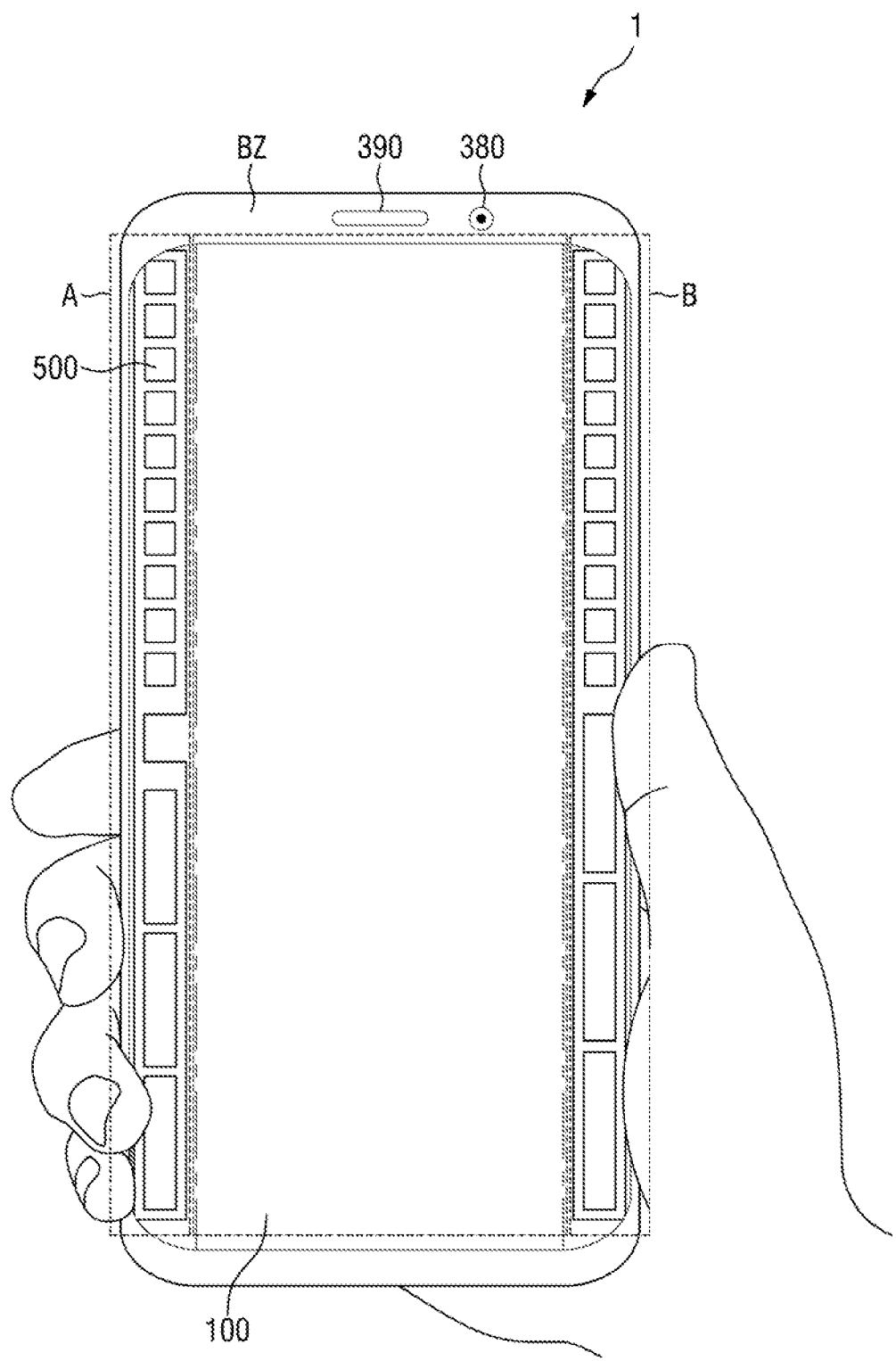
Figure 4:
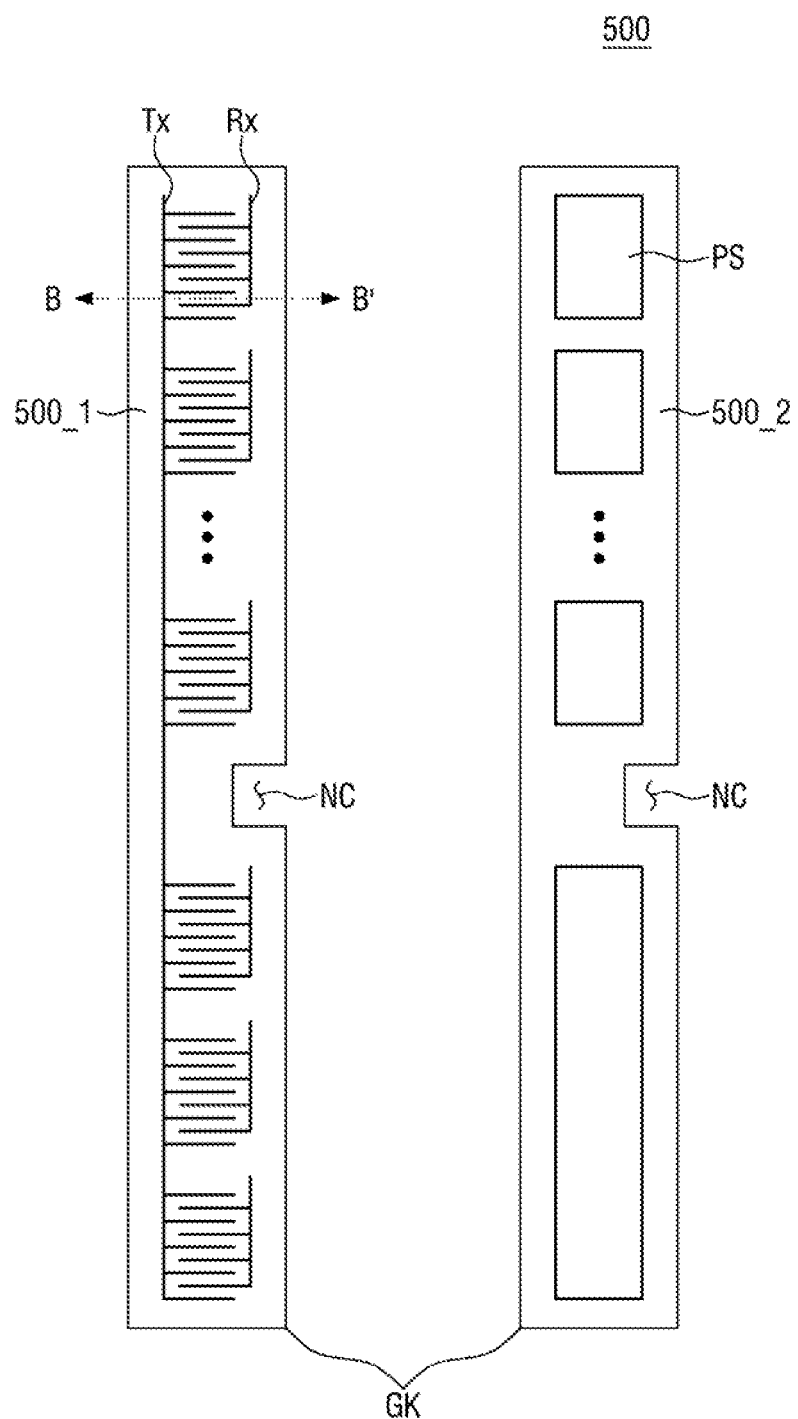
FIG. 4 is an exploded view that illustrates layers of a pressure sensor in an edge area A of FIG. 3A or 3B.
Figure 5A:
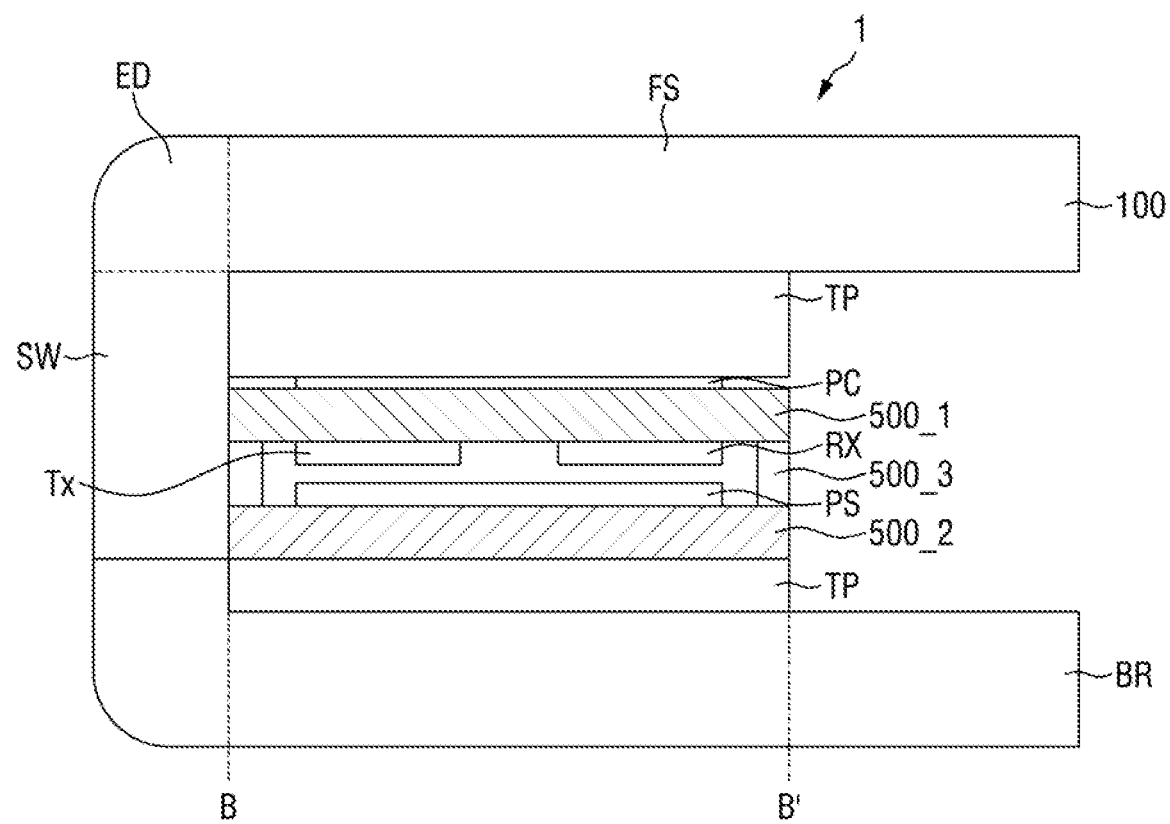
FIG. 5A is a cross-sectional view, taken along line B-B' of FIG. 4, of a pressure sensor of FIG. 4.

FIGS. 3A and 3B are perspective views that illustrate exemplary pressure sensors that can be mounted in the mobile terminal of FIG. 1, FIG. 4 is an exploded view that illustrates layers of a pressure sensor in an edge area A of FIG. 3A or 3B, and FIG. 5A is a cross-sectional view, taken along line B-B' of FIG. 4, of a pressure sensor of FIG. 4.

Referring to FIGS. 1 and 3 through 5, according to an embodiment, the mobile terminal 1 includes the edge touch display 100 and a bezel BZ surrounding the edge touch display 100.

According to an embodiment, the speaker unit 390 and the image pickup unit 380 are disposed at an upper portion of the bezel BZ. Although not specifically illustrated, an illumination sensor, a proximity sensor, etc., can be further disposed in the upper portion of the bezel BZ, the microphone unit 370 is disposed in a lower portion of the bezel BZ, and the edge areas of the edge touch display 100 are disposed in a middle portion of the bezel BZ.

According to an embodiment, the edge touch display 100 is divided into a main area and one or more edge areas. A main area is disposed on a surface of the edge touch display 100 where a home button that returns the display to a home screen or a front speaker is provided, and edge areas are disposed on sides or the rear surface of the edge touch display 100. Alternatively, the main area is where UI elements are displayed and can be directly controlled, and the edge areas are where the UI elements displayed in the main area are indirectly controlled.

According to an embodiment, the size of the edge areas is less than the size of the main area. The edge areas are located on different surfaces from the main area. For example, if the main area is located on the front surface of the edge touch display 1, the edge areas are located on different surfaces from the main area, for example, on the right side, the left side or the rear surface of the edge touch display 100. The surface that includes the main area and the surfaces that include the edge areas form an obtuse angle with each other.

According to an embodiment, the surface that includes the main area and the surfaces that include the edge areas may both be flat or curved with a predetermined curvature. The shape, number, and locations of edge areas may vary.

In an exemplary embodiment, two edge areas are bent at an angle of almost 90 degrees with respect to the surface that include the main area. That is, the surface that includes the main area and the surface that include the edge areas form a right angle with each other. In this case, the entire left and right sides of the edge touch display 100 become edge areas. If the main area 2*o* has a rectangular shape in a plan view, the edge areas are located not only on the left and right sides, but also on the upper and lower sides of the edge touch display 100.

In another exemplary embodiment, the edge areas may in a direction opposite to the main area. The edge touch display 100 is divided into a main area located at the front surface thereof, a first edge area located on a side thereof, and a second edge area located at the rear surface of the edge touch display 100. The second edge area is located on a part of the rear surface of the edge touch display 100 but does not cover the entire rear surface of the edge touch display 100. When a surface that includes the main area and surfaces that include the edge areas are flat, the surface that includes the main area and the surface that includes the second edge area contact each other through the first edge area, and there are linear boundaries between the main area, the first edge area, and the second edge area.

According to an embodiment, the control unit 200 separately controls the main area and the edge areas of the edge touch display 100. For example, the control unit 200 can display different content items in the main area and in the edge areas. The type of content displayed in the main area and in the edge areas and the method and layout in which to display content in the main area and in the edge areas can vary and will be described below in detail.

In an exemplary embodiment, the pressure sensors 500 are disposed in edge areas A and B of the edge touch display 100 in two parallel columns. Specifically, the pressure sensors 500 are attached to the rear surface of the edge touch display 100. The pressure sensors 500 may be an exterior type and may have separate panels, or may be an integral type and may be embedded in the edge touch display 100.

According to an embodiment, each of the pressure sensors 500 includes upper and lower films 500_1 and 500_2. The upper and lower films 500_1 and 500_2 in the edge area A have a notch NC. A panel connector is disposed on the rear surface of the edge touch display 100 to avoid signal interference between the pressure sensors 500 and the panel connector. The upper and lower films 500_1 and 500_2 in the edge area B have a rectangular shape. The upper and lower films 500_1 and 500_2 are formed of polyimide (PI) or polyethylene terephthalate (PET). The upper film 500_2 includes a pressure-sensitive material PS, and the lower film 500_1 is a comb-shaped electrode.

According to an embodiment, the pressure sensors 500 have a first electrode Tx in common and have separate individual second electrodes Rx. The first electrode Tx and the second electrodes Rx are formed of a material such as silver (Ag), copper (Cu), etc., and the pressure-sensitive material PS includes metal nanoparticles in a polymer or carbon (C).

According to an embodiment, in upper parts of the edge areas A and B, the pressure sensors 500 include a plurality of segments. For example, the pressure sensors 500 can be disposed along the long sides of the edge touch display 100 in the longitudinal direction of the edge touch display 100 and includes ten channels, or ten pairs of segments, along about 50% of the length of the long sides of the edge touch display 100. As a result, when the user grips the mobile terminal 1 with one hand, a part of the mobile terminal 1 gripped with the index finger or the thumb at least partially overlaps some of the pressure sensors 500 disposed in the upper parts of the edge areas A and B.

According to an embodiment, in lower parts of the edge areas A and B, the pressure sensors 500 are integrally formed. For example, the pressure sensors 500 extend along the long sides of the edge touch display 100 in the longitudinal direction of the edge touch display 100 and form a single channel along about 50% of the length of the long sides of the edge touch display 100. As a result, when the user holds the mobile terminal 1 with one hand, a part of the mobile terminal 1 gripped by the user at least partially overlaps some of the pressure sensors 500 disposed in the lower parts of the edge areas A and B. However, embodiments of the present disclosure are not limited thereto. In at least one of the lower parts of the edge areas A and B, the pressure sensors 500 may include a plurality of segments. For example, the pressure sensors 500 can be arranged along the left and right sides of the edge touch display 100 in the longitudinal direction of the edge touch display 100 and form three channels, or three pairs of segments along about 50% of the length of the long sides of the edge touch display 100.

According to an embodiment, in the lower parts of the edge areas A and B, the electrodes of each of the pressure sensors 500 are electrically connected, and empty spaces are formed between the electrodes of each of the pressure sensors 500. A gasket GK for the pressure-sensitive material PS is further provided on outer sides of the upper and lower films 500_1 and 500_2. The electrodes of each of the pressure sensors 500 may be integrally formed, instead of being separated from one another.

Referring to FIG. 5A, in some exemplary embodiments, the pressure sensors 500 are interposed between the edge touch display 100 and a bracket BR. The edge touch display 100 has a front surface FS that corresponds to the main area, a side SW that corresponds to the edge areas, and an edge ED. Specifically, the pressure sensors 500 is coupled between the edge touch display 100 and the bracket BR via an adhesive layer such as a tape TP. In each of the pressure sensors 500, a pressure concentration structure PC is disposed on one surface of the lower film 500_1, and first and second electrodes Tx and Rx are disposed on the other surface of the lower film 500_1. In addition, in each of the pressure sensors 500, the pressure-sensitive material PS is disposed on one surface of the upper film 500_2. The surface of the upper film 500_2 where the pressure-sensitive material PS is disposed faces the surface of the lower film 500_1 where the first and second electrodes Tx and Rx are disposed, and a supporting structure 500_3 is disposed between the upper and lower films 500_1 and 500_2 to form an empty space.

According to an embodiment, the pressure concentration structure PC may be formed of Ag, Ti/Al/Ti, Ti/Cu, or may be a high-hardness insulator. The size of the pressure concentration structure PC is less than the sizes of a sensor node. For example, the size of the pressure concentration structure PC may be about 5×5 mm, and the height of the pressure concentration structure PC may be about 5 μm.

Figure 5B:
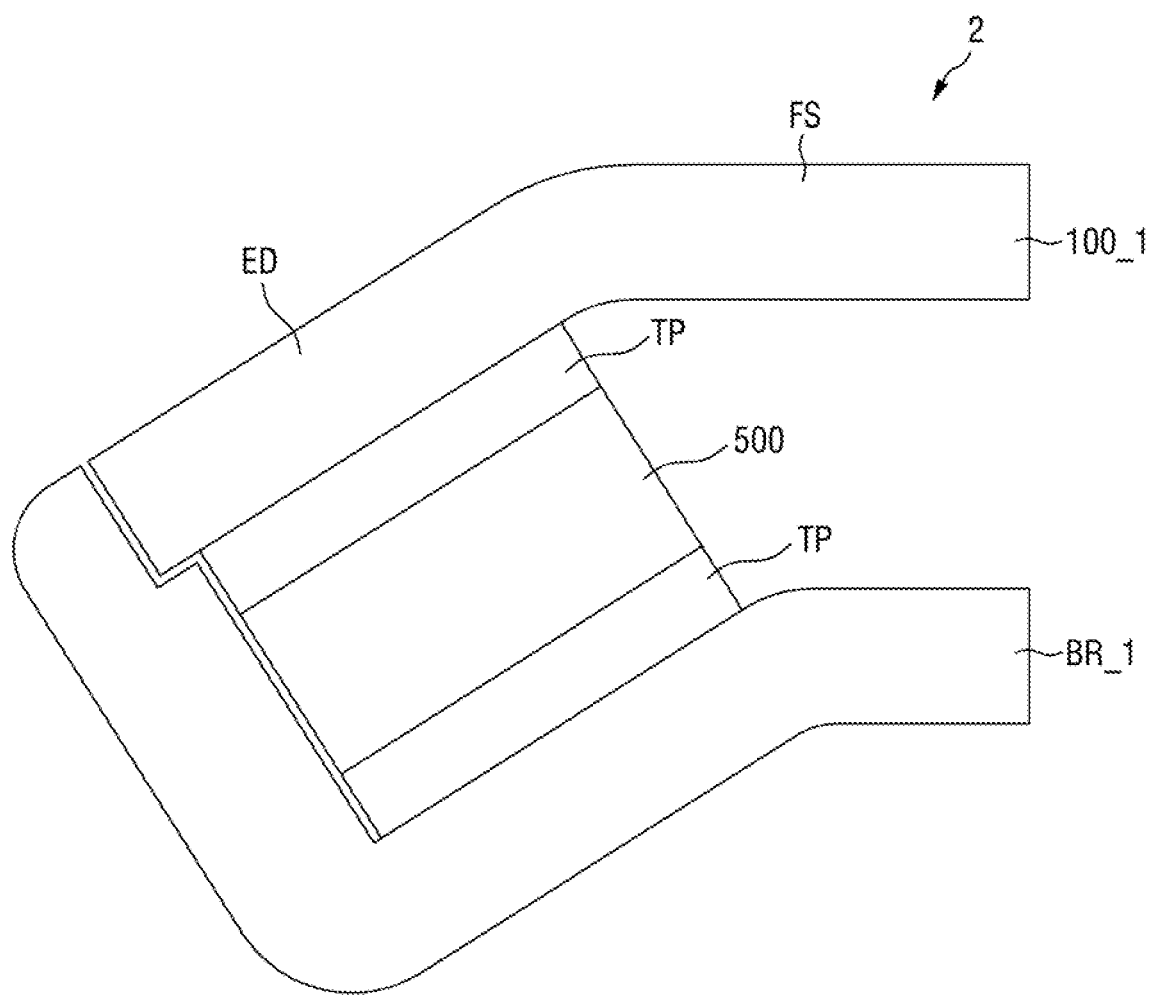
FIG. 5B is a cross-sectional view of a display device according to an exemplary embodiment.

FIG. 5B is a cross-sectional view of a display device 2 according to an exemplary embodiment.

FIG. 5B shows that the attachment position of a force sensor 500 in the display device 2 can be changed. That is, as illustrated in FIG. 5B, the force sensor 500 can be disposed such that it overlaps the edge ED of the display panel 100_1. That is, the force sensor 500 is disposed at a lower surface of the edge ED of the display panel 100_1.

Figure 5C:
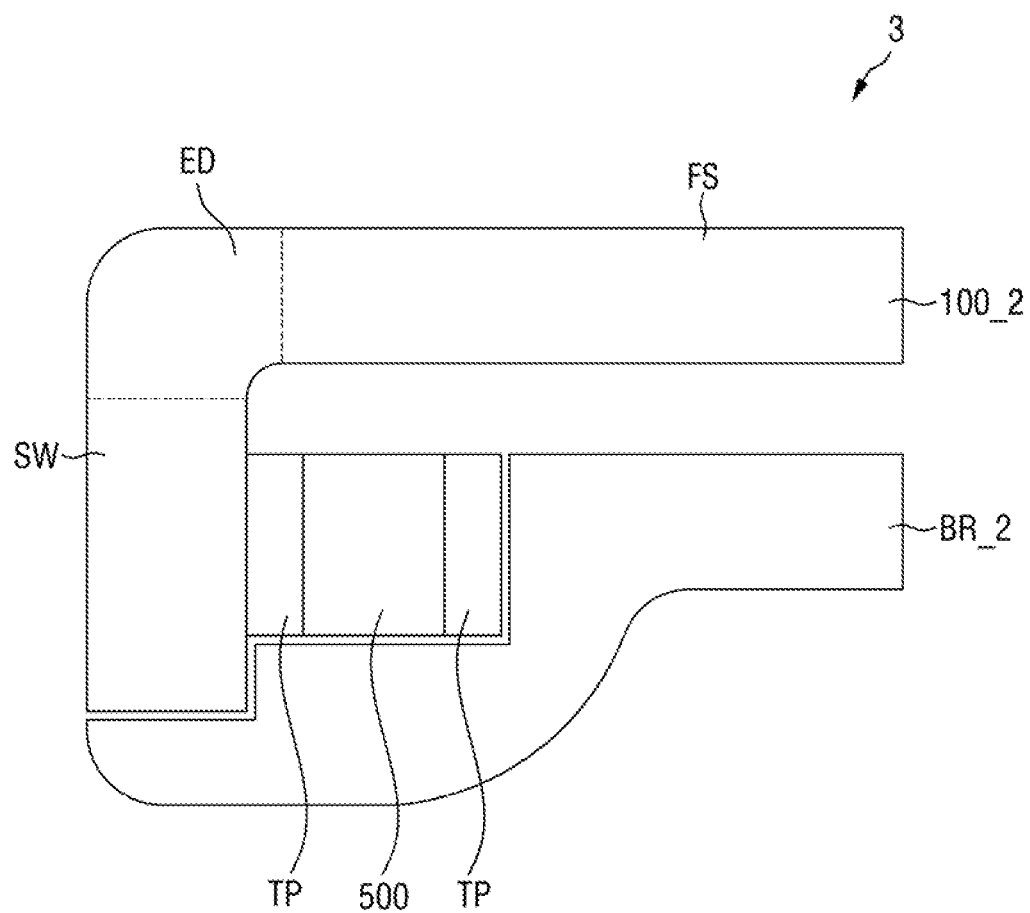
FIG. 5C is a cross-sectional view of a display device according to an exemplary embodiment.

FIG. 5C is a cross-sectional view of a display device 3 according to an exemplary embodiment.

FIG. 5C shows that the side SW of the display device 3 lies in a plane located at an angle of about 90 degrees to the front surface FS. The side SW is a display surface, and corresponds to a non-display area. The force sensor 500 is attached to a lower surface of the side SW of the display device 3. Since the force sensor 500 is attached to the side surfaces of the display device 3 in an exemplary embodiment of FIG. 5C, a user can easily input a force while gripping the display device 3.

Figure 6:
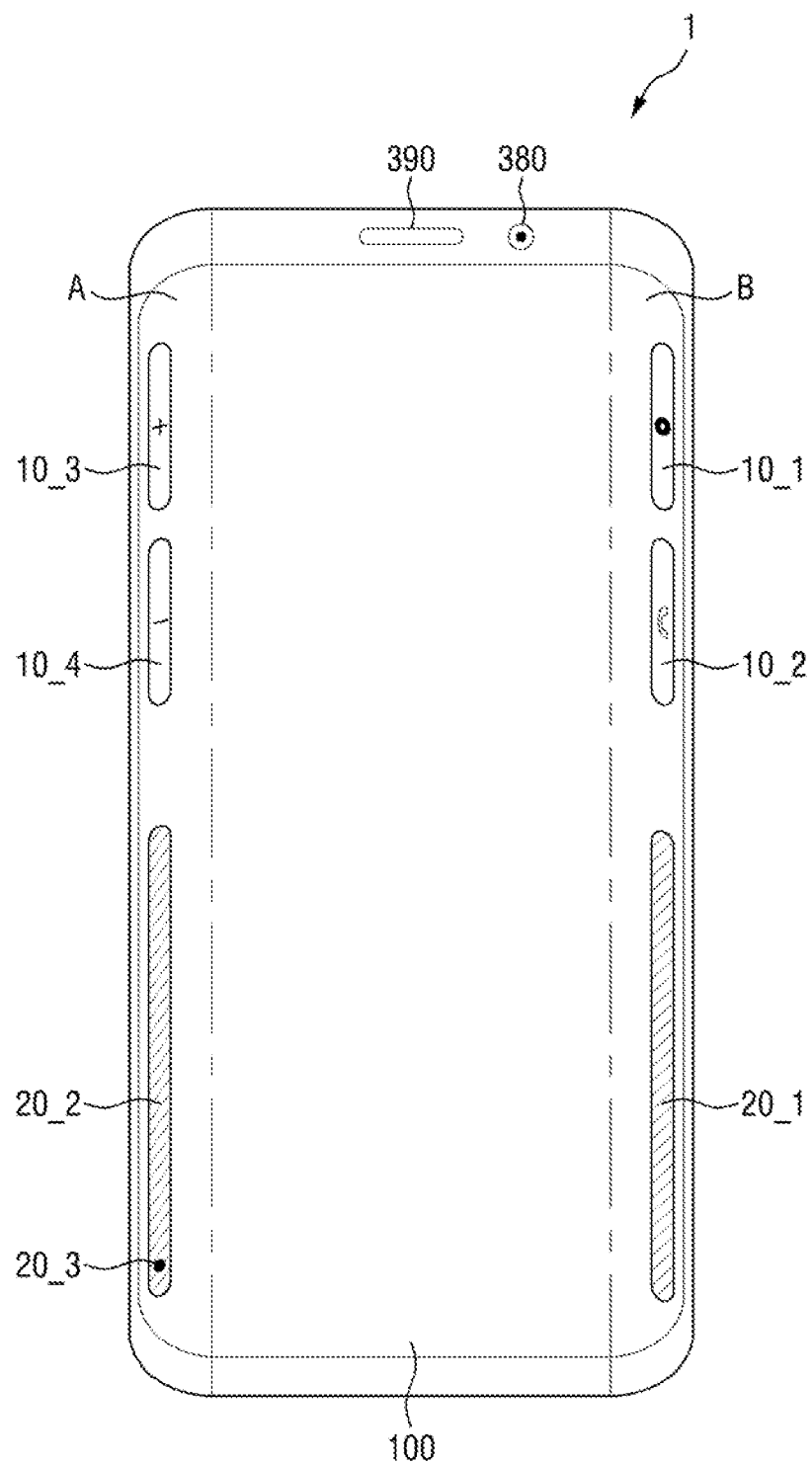
FIGS. 6 and 7 are schematic views that illustrate display screens of a mobile terminal of FIG. 1.
Figure 7:
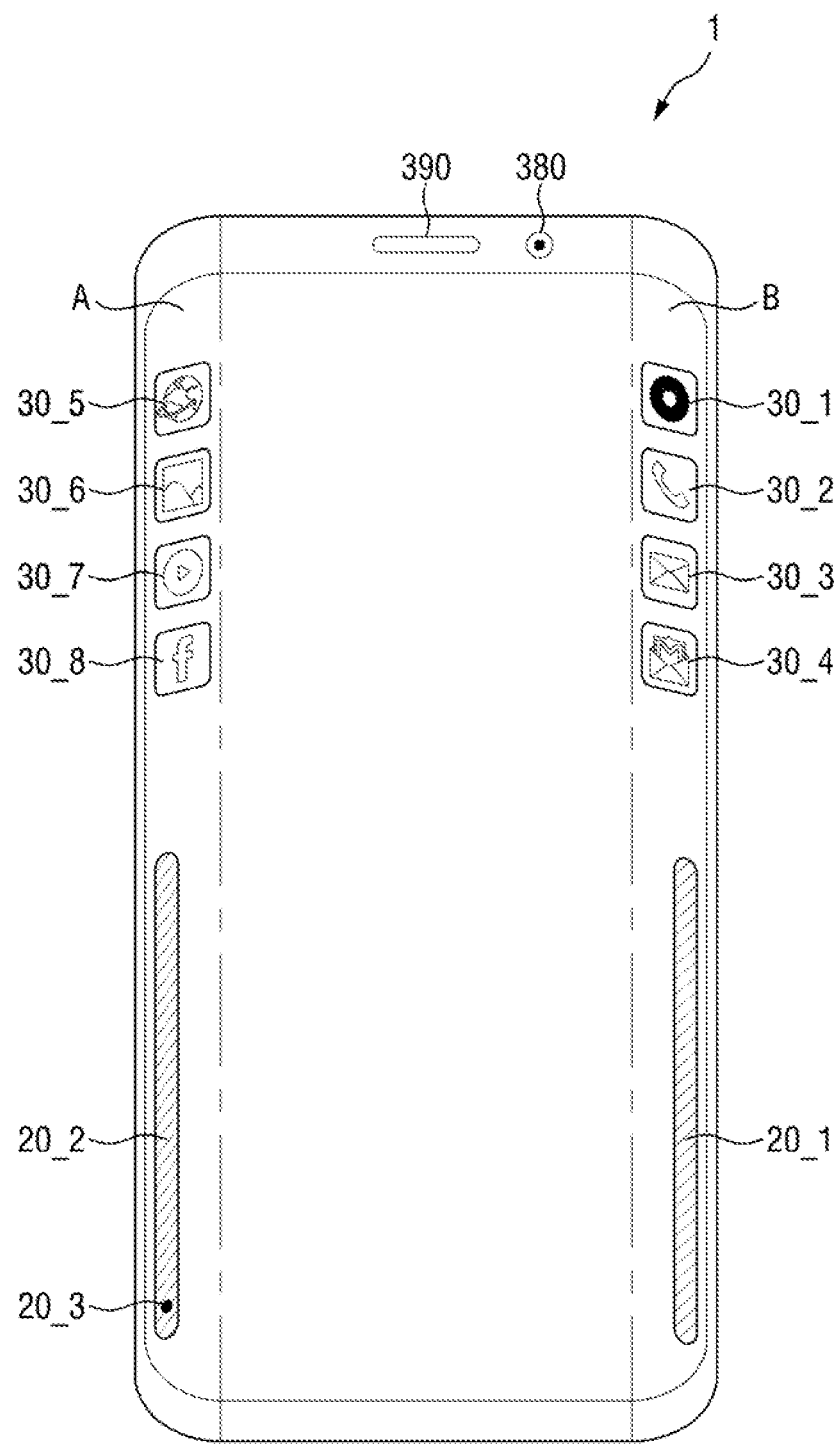

FIGS. 6 and 7 are schematic views that illustrate display screens of the mobile terminal of FIG. 1.

Referring to FIGS. 6 and 7, according to an embodiment, the control unit 200 displays a plurality of items (10 and 20) in the edge areas A and B of the edge touch display 100.

Specifically, according to an embodiment, the control unit 200 displays a power key 10_1 and a call key 10_2, which are bar-shaped, in the upper part of the edge area B and displays a volume up key 10_3 and a volume down key 10_4, which are also bar-shaped, in the upper part of the edge area A. The power key 10_1, the call key 10_2, the volume up key 103, and the volume down key 10_4 overlap segments disposed in the upper parts of the edge areas A and B. In one exemplary embodiment, each of the power key 10_1, the call key 10_2, the volume up key 10_3, and the volume down key 10_4 overlaps five segments. That is, two bar-shaped items 10 are disposed in each of the upper parts of the edge areas A and B, and the length of each of the two bar-shaped items is equal to the sum of the lengths of five segments.

According to an embodiment, the power key 10_1, the call key 10_2, the volume up key 10_3, and the volume down key 10_4 are not particularly limited in shape and may have various forms. For example, the control unit 200 can displays a plurality of items 30, which are set in advance by the user, in the edge areas A and B of the edge touch display 100. Specifically, as illustrated in FIG. 7, the control unit 200 displays a power key 30_1, a call key 30_2, a message icon 30_3, and an email icon 30_4, which are square-shaped and correspond to applications that can be executed, in the upper part of the edge area B, and displays an Internet 1o icon 30_5, a photo album icon 30_6, a music player icon 30_7, and an SNS icon 30_8, which are square-shaped and correspond to applications that can be executed, in the upper part of the edge area A. In an exemplary embodiment, each of the items 30_1 through 30_8 overlaps two segments. That is, four square-shaped items are disposed in each of the upper parts of the left and right edges A and B, and the length of each of the four square-shaped items is equal to the sum of the lengths of two segments.

According to an embodiment, the control unit 200 displays a bar-shaped squeezing bar 20_1 in the lower part of the edge area B and displays a bar-shaped squeezing bar 20_2 that includes a menu hiding key 20_3 in the lower part of the edge area A. In response to an input signal being recognized from the menu hiding key 203, the control unit 200 hides the items (10 and 20) on the edge touch display 100. In an exemplary embodiment, the squeezing bars 20_1 and 20_2 overlap a pair of pressure sensors 500 that are integrally formed as bars in the lower parts of the edge areas A and B.

According to an embodiment, the type, shape, size, and number of items (10 and 20) and the type of haptic effect associated with the items (10 and 20) are not particularly limited.

In an exemplary embodiment, the control unit 200 displays a control window for setting the type, shape, size, and number of items (10 and 20) and the type of haptic effect associated with the items (10 and 20) on the edge touch display 100. Accordingly, the user can select application icons to be displayed in the edge areas A and B and change the type, shape, size, and number of items corresponding to the selected application icons and the type of haptic effects associated with the selected application icons according to his or her preferences.

In another exemplary embodiment, the control unit 200 sequentially arranges the selected application icons in order of the frequency of use in regions starting from a region that the user can most easily control with one hand. For example, if a right-handed user grips the mobile terminal 1 with his or her left hand, the control unit 200 arranges the selected application icons first in parts of the edge areas A and B that the user can easily manipulate with his or her left thumb or left index finger.

In yet another exemplary embodiment, if the user selects application icons to be displayed in the edge areas A and B, the control unit 200 determines the number of selected application icons and determines the size of icons to be displayed based on the number of segments. For example, if the number of selected application icons that the user desires to display in the upper part of the edge area A is ten and the number of segments disposed in the upper part of the edge area A is also ten, the control unit 200 determines the size of each of the ten selected application icons to coincide with the size of each of the ten segments. That is, the control unit 200 displays the ten selected application icons to overlap one-to-one with the ten segments in the upper part of the edge area A.

According to an embodiment, operating states of the mobile terminal 1 include a system-off mode in which no power is supplied, a sleep mode that includes a lock screen state that is a power saving state, an idle mode in which there is no input for more than a predetermined amount of time, and an active mode in which a process that corresponds to input is performed. The system-off mode and the sleep mode both correspond to a state in which the edge touch display 100 is turned off. In particular, in the system-off state, the application manager 630_2 and the edge touch display 100 are both turned off and low power is supplied.

In an exemplary embodiment, the control unit 200 activates or enables at least some of the pressure sensors 500 during a period when the edge touch display 100 is turned off. In this case, the control unit 200 displays the items (10 and 20) on the edge touch display 100 at a reduced transparency level. The transparency level of the items (10 and 20) ranges from 10 to 90, where the transparency level refers to the percentage of light being transmitted through the items (10 and 20). For example, the control unit 200 activates some or all of the pressure sensors 500 not only when the mobile terminal 1 is in an awake state, but also when the mobile terminal 1 is in a standby state where the edge touch display 100 is turned off. The control unit 200 at least partially disables the touch sensor 921 during a period when the edge touch display 100 is turned off or the mobile terminal 1 is in the standby state. Accordingly, the control unit 200 displays the items (10 and 20) on the edge touch display 100 at a transparency level of 50.

In an exemplary embodiment, if a predetermined condition is met when the edge touch display 100 is turned off, the control unit 200 actives at least some of the pressure sensors 500. Then, the control unit 200 displays the items (10 and 20) on the edge touch display 100. For example, at a predetermined time after the edge touch display 100 is turned off, the control unit 200 activates the pressure sensors 500 for a predetermined duration during which the control unit 200 displays the items (10 and 20) on the edge touch display 100. In another example, in response to the use of the mobile terminal 1 by the user being detected by a gyro sensor or a proximity sensor, the control unit 200 activates the pressure sensors 500 and displays the items (10 and 20) on the edge touch display 100. In yet another example, if the temperature is below a predefined level for a predetermined duration, if touch input is detected from the edge touch display 100, if the mobile terminal 1 is being approached by an external device, or if the stylus embedded in the mobile terminal 1 is taken out of the mobile terminal 1, the control unit 200 activates the pressure sensors 500. In yet still another example, when an application such as a music player is being executed in the standby state, the control unit 200 activates the pressure sensors 500 and displays the items (10 and 20) on the edge touch display 100.

In an exemplary embodiment, if a predetermined condition is met when the edge touch display 100 is turned off, the control unit 200 inactivates at least some of the pressure sensors 500. In this case, the control unit 200 does not display the items (10 and 20) on the edge touch display 100.

For example, when the mobile terminal 1 is detected as being placed in a pocket or a bag, etc., or as being turned upside down by a proximity sensor, an illumination sensor, an acceleration sensor or a gyro sensor, the control unit 200 inactivates the pressure sensors 500. In another exemplary embodiment, if the mobile terminal 1 is connected to an external device, such as a desktop computer, the control unit 200 inactivates the pressure sensors and does not display the items (10 and 20) on the edge touch display 100.

In an exemplary embodiment, during a period when the edge touch display 100 is turned off, the control unit 200 activates only some of the pressure sensors 500 in a predetermined region. In this case, the control unit 200 displays some of the items (10 and 20) on the edge touch display 100. For example, to reduce power consumption of the mobile terminal 1 when the mobile terminal 1 is in a standby state, the control unit 200 activates some of the pressure sensors 500 in a predetermined region, such as pressure sensors 500 disposed in the lower parts of the edge areas A and B, and displays the squeezing bars 20_1 and 20_2 that overlap the pressure sensors 500 on the edge touch display 100.

As described above, according to an embodiment, by activating or enabling the pressure sensors 500, the control unit 200 detects pressure input from the pressure sensors 500 when the mobile terminal 1 is in a standby state. For example, during a period when the edge touch display 100 is turned off, the control unit 200 can receive data regarding pressure applied to the edge touch display 100 by an external object from the pressure sensors 500.

Figure 8:
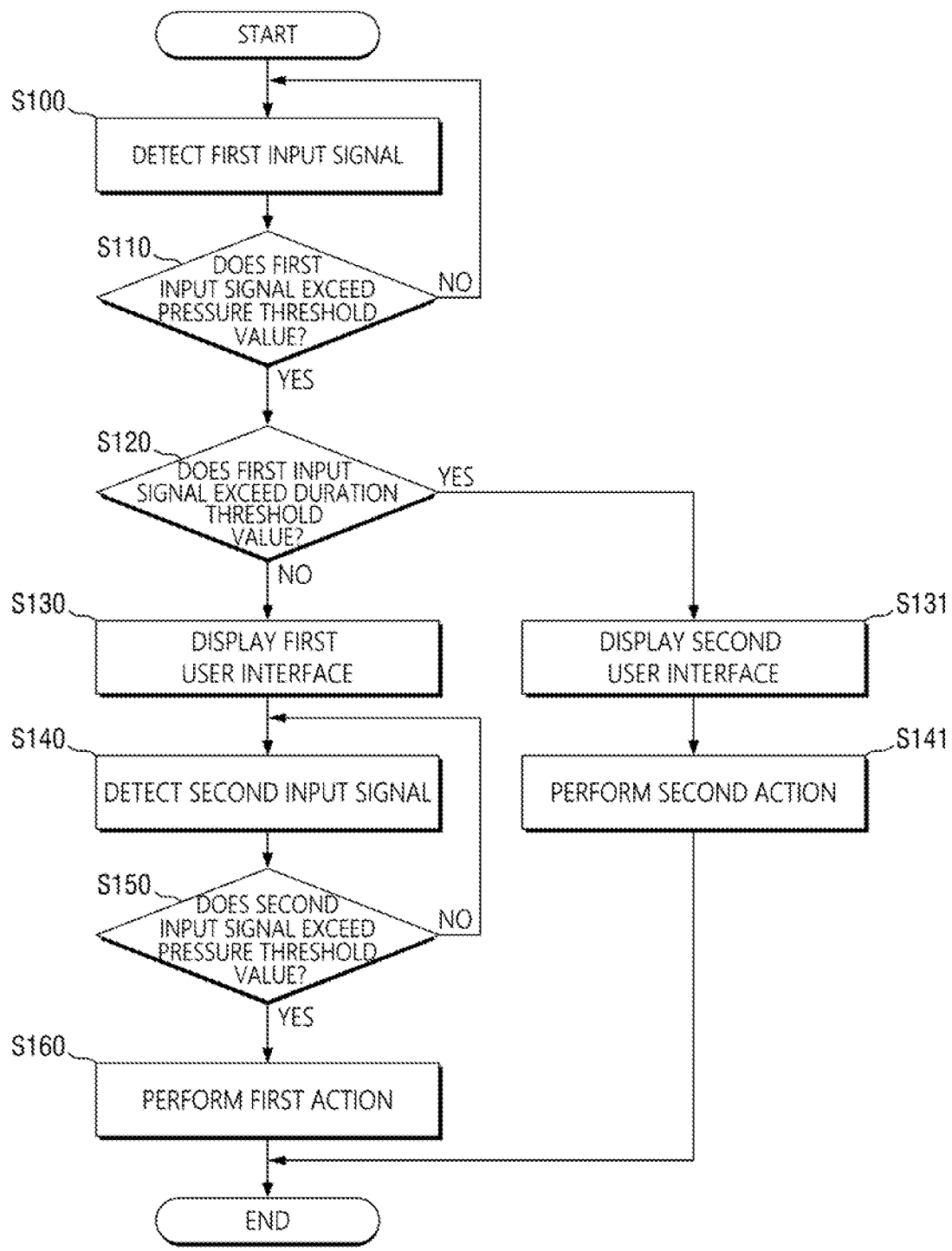
FIG. 8 is a flowchart that illustrates an action of a mobile terminal according to an exemplary embodiment of the present disclosure.

FIG. 8 is a flowchart that illustrates an action of a mobile terminal according to an exemplary embodiment of the present disclosure.

Referring to FIG. 8, according to an embodiment, the control unit 200 of the mobile terminal 1 detects a first input signal via the pressure sensors 500 (step S100). The first input signal may be a pressure signal from the user for the edge areas A and B of the edge touch display 100. For example, the first input signal may be a pressure signal from one of the power key 10_1, the call key 10_2, the volume up key 10_3, or the volume down key 10_4, which are disposed in the upper parts of the edge areas A and B. In another example, the first input signal may be a pressure signal generated by squeezing both the squeezing bars 20_1 and 202, which are disposed in the lower parts of the edge areas A and B, at the same time.

According to an embodiment, the control unit 200 determines whether the first input signal exceeds a predetermined pressure threshold value (step S110). If the first input signal does not exceed the predetermined pressure threshold value, the control unit 200 detects a new input signal via the pressure sensors 500.

According to an embodiment, if the first input signal exceeds the predetermined pressure threshold value, the control unit 200 determines whether the first input signal exceeds a predetermined duration threshold value (step S120). If the first input signal does not exceed the predetermined duration threshold value, the control unit 200 displays a first UI on the edge touch display 100 (step S130). The first UI may correspond to an application execution screen. In addition, if the first input signal exceeds the predetermined pressure threshold value, the control unit 200 vibrates a predetermined pattern via the haptic module. 600 Accordingly, the user can feel like an actual physical button has been pressed. The control unit 200 vibrates different patterns when the items disposed in the upper parts of the edge areas A and B are pressed than when the items disposed in the lower parts of the edge areas A and B are pressed.

After the display of the first UI, according to an embodiment, the control unit 200 detects a second input signal via the pressure sensors 500 (step S140). The second input signal may be a pressure signal from the user for the edge areas A and B of the edge touch display 100. For example, the second input signal may be a pressure signal from one of the power key 10_1, the call key 10_2, the volume up key 10_3, or the volume down key 10_4, which are disposed in the upper parts of the edge areas A and B. In another example, the second input signal may be a pressure signal generated by squeezing both squeezing bars 20_1 and 20_2, which are disposed in the lower parts of the edge areas A and B, at the same time.

According to an embodiment, the control unit 200 determines whether the second input signal exceeds the predetermined pressure threshold value (step S150). If the second input signal exceeds the predetermined pressure threshold value, the control unit 200 performs a first action (step S160). The first action may be a click, a drag, or a scroll for selecting or executing an action associated with one of a plurality of menu items included in the first UI and may vary depending on the type of the first UI. If the second input signal does not exceed the predetermined pressure threshold value, the control unit 200 detects a new input signal via the pressure sensors 500.

According to an embodiment, if the duration of the first input signal exceeds the predetermined duration threshold value, the control unit 200 displays a second UI on the edge touch display 100 (step S131). The second UI may be an application execution screen. In addition, the control unit 200 can perform a second action without the need of additional input (step S141). The second action may be a click, a drag, or a scroll for selecting or executing an action associated with one of a plurality of menu items included in the second UI and may vary depending on the type of the second UI.

Figure 9:
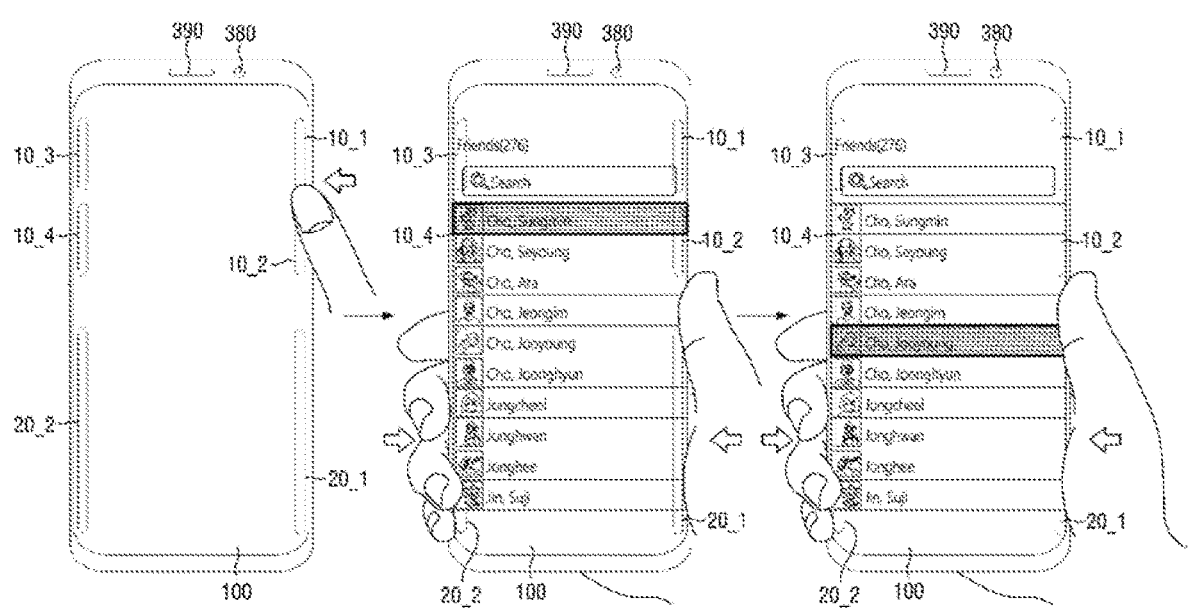
FIG. 9 illustrates call list display screens of a mobile terminal of FIG. 8.

FIG. 9 illustrates call list display screens of the mobile terminal of FIG. 8.

According to an embodiment, an action of the mobile terminal 1 when a first input signal is entered for one of the power key 10_1, the call key 10_2, the volume up key 10_3, or the volume down key 10_4 that exceeds the predetermined pressure threshold value but does not an exceed the predetermined duration threshold value, and a second input signal is entered for one of the squeezing bars 20_1 or 20_2 that exceeds the predetermined pressure threshold value, will hereinafter be described with reference to FIG. 9.

Referring to FIG. 9, according to an embodiment, the user presses the call key 10_2, as illustrated in the left image of FIG. 9. If a determination is made that the first input signal exceeds the predetermined pressure threshold value but does not exceed the predetermined duration threshold value, the control unit 200 displays a call list on the edge touch display 100, as illustrated in the center image of FIG. 9. The call list may be a list of contacts that recently interacted with the user or a list of favorite contacts set by the user.

Thereafter, according to an embodiment, the user squeezes the lower parts of the edge areas A and B where the squeezing bars 20_1 and 20_2 are displayed, as illustrated in the center image of FIG. 9. If a determination is made that the pressure applied to the lower parts of the edge areas A and B exceeds a predetermined level, the control unit 200 scrolls the call list, as illustrated in the right image of FIG. 9. The control unit 200 changes the direction of scrolling the call list based on whether an input signal is entered for the squeezing bars 20_1 and 20_2 an even number of times or an odd number of times. In addition, the control unit 200 increases or decreases the speed of scrolling the call list depending on the pressure applied to the squeezing bars 20_1 and 20_2.

Figure 10:
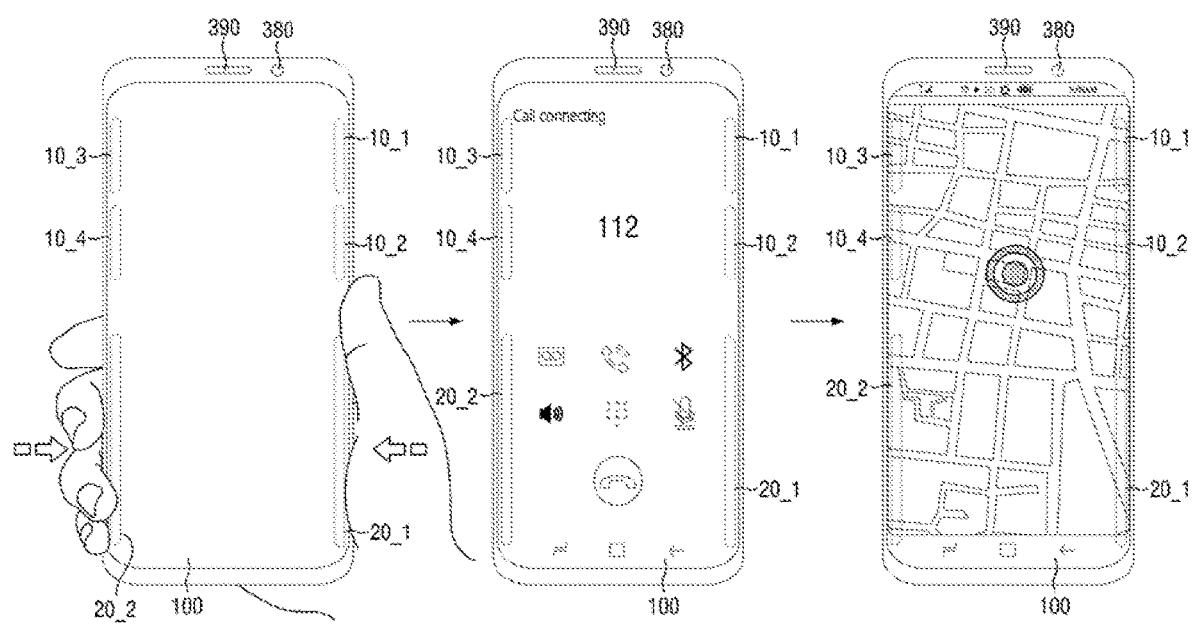
FIG. 10 illustrates emergency call display screens of a mobile terminal of FIG. 8.

FIG. 10 illustrates emergency call display screens of the mobile terminal of FIG. 8.

According to an embodiment, an action of the mobile terminal 1 when a first input signal that exceeds both the predetermined pressure threshold value and the predetermined duration threshold value is received from the squeezing bars 20_1 and 202 in sleep mode, will hereinafter be described with reference to FIG. 10.

Referring to FIG. 10, according to an embodiment, the user squeezes the lower parts of the edge areas A and B with the edge touch display 100 turned off, as illustrated in the left image of FIG. 10. The control unit 200 does not display the items (10 and 20) when the edge touch display 100 is turned off, but embodiments of the present disclosure are not limited thereto. Alternatively, as already described above, the control unit 200 can always display the items (10 and 20) on the edge touch display 100 simply by adjusting the transparency of the items (10 and 20).

According to an embodiment, if a determination is made that the first input signal exceeds both the predetermined pressure threshold value and the predetermined duration threshold value, the control unit 200 displays an emergency call execution screen on the edge touch display 100, as illustrated in the center image of FIG. 10. In addition, the control unit 200 displays map with the user's current location, as illustrated in the right image of FIG. 10, and sends the map to the destination of an emergency call. The control unit 200 stores the phone number of the destination of the emergency call in the storage unit 310. The control unit 200 displays the map with the user's current location using the GPS chip 320 or the communication unit 330.

Figure 11:
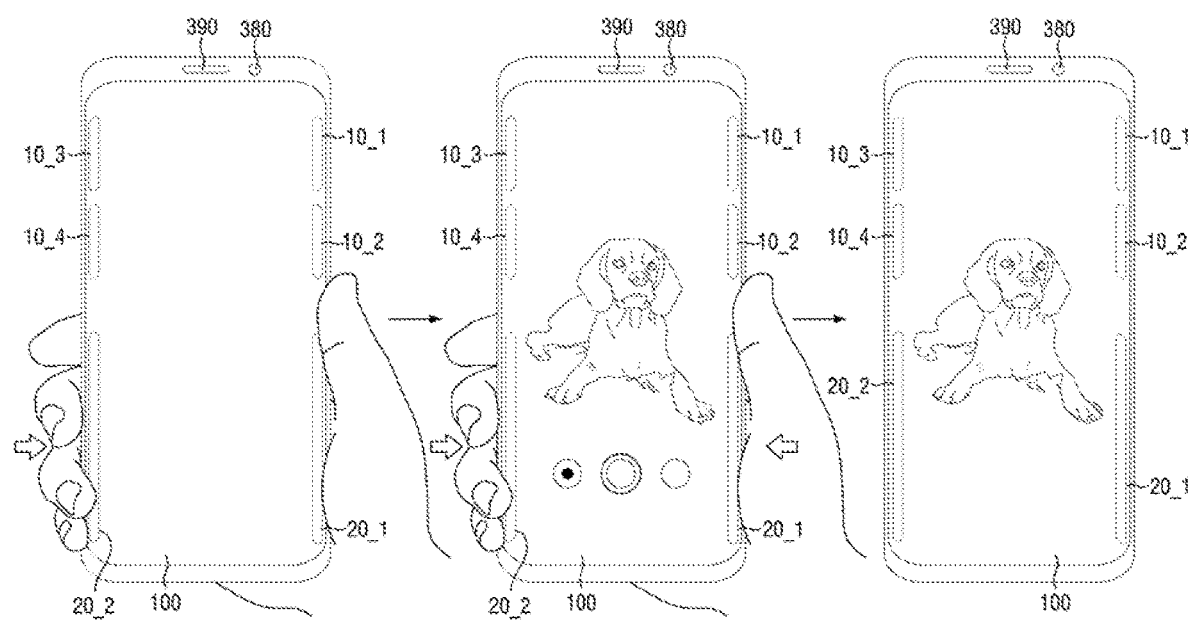
FIG. 11 illustrates camera execution display screens of a mobile terminal of FIG. 8.

FIG. 11 illustrates camera execution display screens of the mobile terminal of FIG. 8.

According to an embodiment, an action of the mobile terminal 1 when a first input signal that exceeds the predetermined pressure threshold value but does not exceed the predetermined duration threshold value is received from the squeezing bars 20_1 and 20_2 in sleep mode and a second input signal that exceeds the predetermined pressure threshold value is also received from the squeezing bars 20_1 and 20_2 will hereinafter be described with reference to FIG. 11.

Referring to FIG. 11, according to an embodiment, the user squeezes the lower parts of the edge areas A and B with the edge touch display 100 turned off, as illustrated in the right image of FIG. 11. The control unit 200 does not display the items (10 and 20) when the edge touch display 100 is turned off, but embodiments of the present disclosure are not limited thereto. Alternatively, as already described above, the control unit 200 can always display the items (10 and 20) on the edge touch display 100 simply by adjusting the transparency of the items (10 and 20).

According to an embodiment, if a determination is made that the first input signal exceeds the predetermined pressure threshold value but does not exceed the predetermined duration threshold value, the control unit 200 displays a camera preview screen on the edge touch display 100, as illustrated in the center image of FIG. 11. The user squeezes the squeezing bars 20_1 and 20_2 again. In this case, the control unit 200 captures the camera preview screen if the pressure applied to the squeezing bars 20_1 and 20_2 exceeds a predetermined level.

In addition, according to an embodiment, if the duration of input for the squeezing bars 20_1 and 20_2 is relatively short, i.e., shorter than a predetermined duration threshold, the control unit 200 captures a still image of the camera preview screen, as illustrated in the right image of FIG. 11. On the other hand, if the duration of input for the squeezing bars 20_1 and 20_2 is relatively long, i.e., longer than the predetermined duration threshold, the control unit 200 captures a moving image of the camera preview screen.

Figure 12:
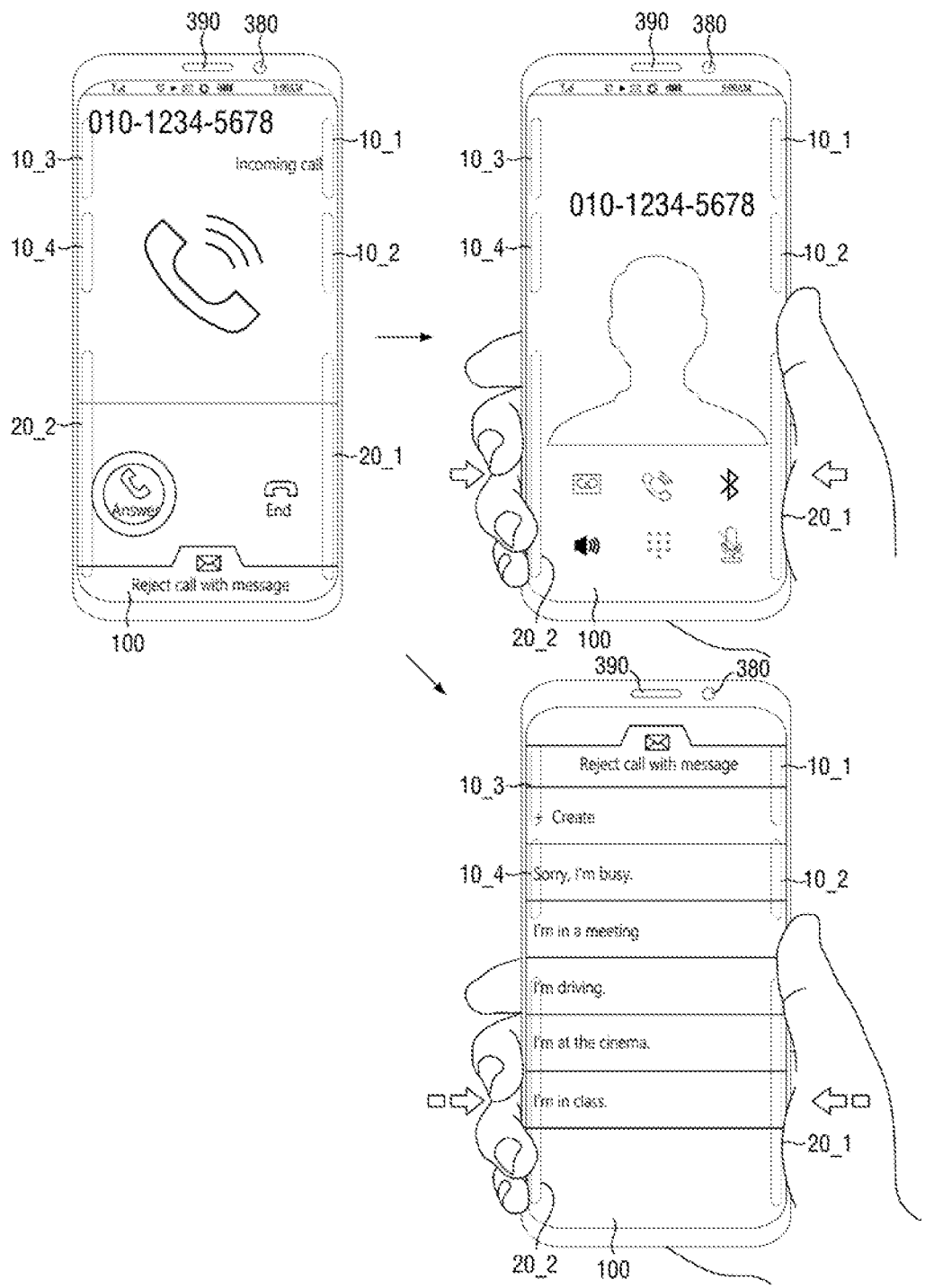
FIG. 12 illustrates incoming call display screens of a mobile terminal of FIG. 8.

FIG. 12 illustrates incoming call display screens of the mobile terminal of FIG. 8.

According to an embodiment, an action of the mobile terminal 1 when a first input signal that exceeds both the predetermined pressure threshold value and the predetermined duration threshold value is received from the squeezing bars 20_1 and 20_1 and when there is an incoming call, and an action of the mobile terminal 1 when a first input signal that exceeds the predetermined pressure threshold value but does not exceed the predetermined duration threshold 1o value is received from the squeezing bars 20_1 and 20_1 and when there is an incoming call, will hereinafter be described with reference to FIG. 12.

Referring to FIG. 12, according to an embodiment, when an incoming call screen is displayed on the edge touch display 100, as illustrated in the left image of FIG. 12, the user squeezes the squeezing bars 20_1 and 20_2, as illustrated in the center image of FIG. 12. If a determination is made that the first input signal exceeds the predetermined pressure threshold value but does not exceed the predetermined duration threshold value, the control unit 200 displays a call screen on the edge touch display 100 and receive the incoming call.

On the other hand, according to an embodiment, if a determination is made that the first input signal exceeds both the predetermined pressure threshold value and the predetermined duration threshold value, the control unit 200 displays a call reject screen on the edge touch display 100, as illustrated in the right image of FIG. 12, and rejects the incoming call. In this case, the control unit 200 also displays a menu for selecting a call reject message on the edge touch display 100.

Figure 13:
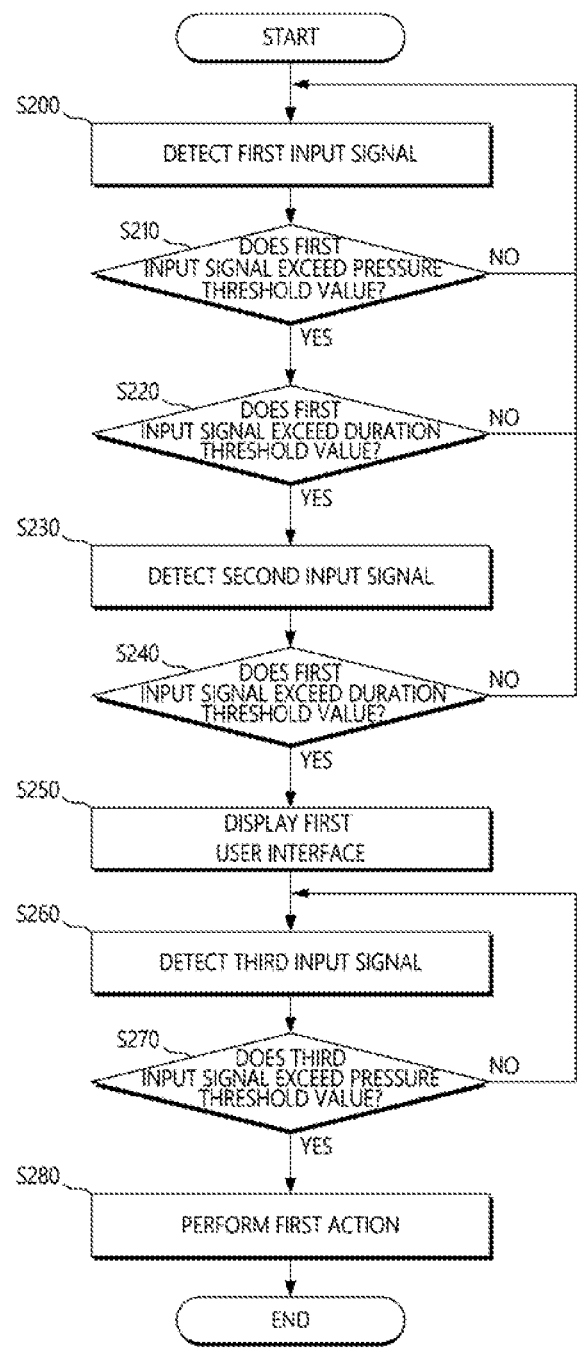
FIG. 13 is a flowchart of an action of a mobile terminal according to another exemplary embodiment of the present disclosure.

FIG. 13 is a flowchart that illustrates an action of a mobile terminal according to another exemplary embodiment of the present disclosure.

Referring to FIG. 13, according to an embodiment, the control unit 200 of the mobile terminal 1 detects a first input signal via the pressure sensors 500 (step S200). The first input signal may be a pressure signal from the user for the edge areas A and B of the edge touch display 100. For example, the first input signal is a pressure signal from one of the power key 10_1, the call key 10_2, the volume up key 10_3, or the volume down key 10_4, which are disposed in the upper parts of the edge areas A and B.

According to an embodiment, the control unit 200 determines whether the first input signal exceeds a predetermined pressure threshold value (step S210). If the first input signal does not exceed the predetermined pressure threshold value, the control unit 200 detects a new input signal via the pressure sensors 500.

According to an embodiment, if the first input signal exceeds the predetermined pressure threshold value, the control unit 200 determines whether the first input signal exceeds a predetermined duration threshold value (step S220). If the first input signal exceeds the predetermined duration threshold value, the control unit 200 detects a second input signal via the pressure sensors 500 (step S230). The second input signal may be, for example, a pressure signal generated by squeezing both the squeezing bars 20_1 and 20_2 at the same time.

According to an embodiment, the predetermined duration threshold value of step S220 is shorter than predetermined duration threshold value of FIG. 8. That is, the first and second input signals can be generated substantially simultaneously.

Thereafter, according to an embodiment, the control unit 200 determines whether the second input signal exceeds the predetermined pressure threshold value (step S240). If the second input signal does not exceed the predetermined pressure threshold value, the control unit 200 detects a new input signal via the pressure sensors 500.

According to an embodiment, if the second input signal exceeds the predetermined pressure threshold value, the control unit 200 displays a first UI on the edge touch display 100 (step S250). The first UI is an application execution screen. In addition, if both the first and second input signals exceed the predetermined pressure threshold value, the control unit 200 vibrates a predetermined pattern via the haptic module 600. Accordingly, the user feels like an actual physical button is being pressed.

Thereafter, according to an embodiment, the control unit 200 detects a third input signal via the pressure sensors 500 (step S260). The third input signal may be a swipe input signal from the user for the edge areas A and B of the edge touch display 100. For example, the third input signal is a swipe input signal for at least one of the power key 101, the call key 102, the volume up key 10_3, or the volume down key 10_4. Here, the swipe input signal is a pressure signal having a predetermined pressure level.

Thereafter, according to an embodiment, the control unit 200 determines whether the third input signal exceeds the predetermined pressure threshold value (step S270). If the third pressure signal exceeds the predetermined pressure threshold value, the control unit 200 performs the first action. The first action may be a click, a drag, or a scroll for selecting or executing one of a plurality of actions associated with menu items included in the first UI and may vary depending on the type of the first UI.

Figure 14A:
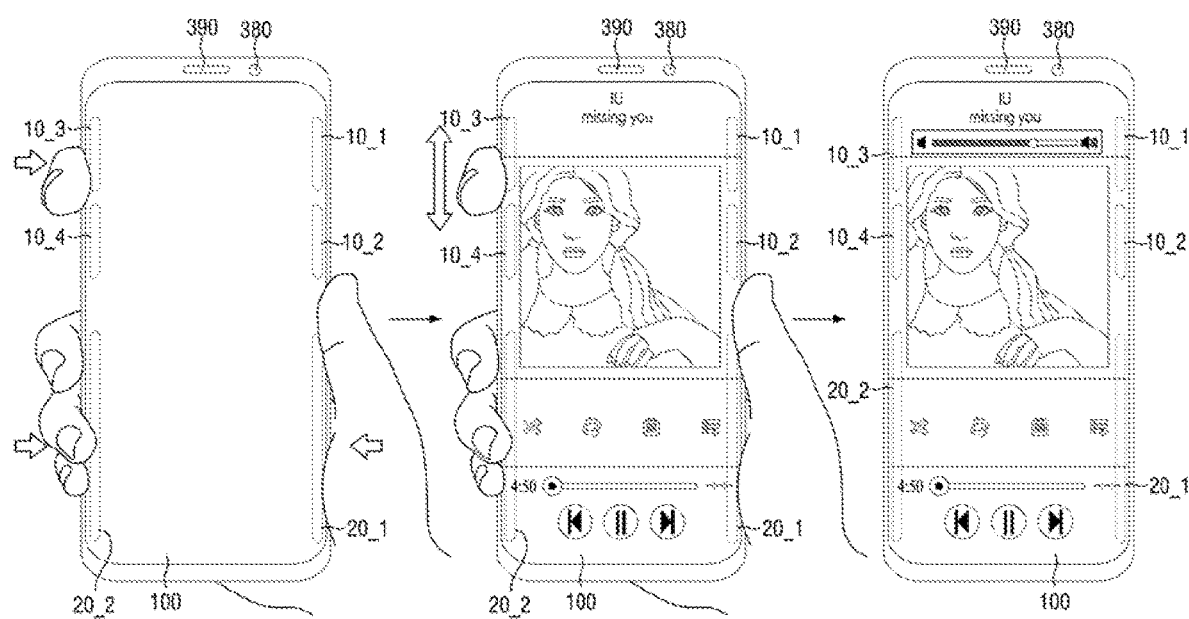
FIGS. 14A and 14B illustrate music player display screens of a mobile terminal of FIG. 13.
Figure 14B:
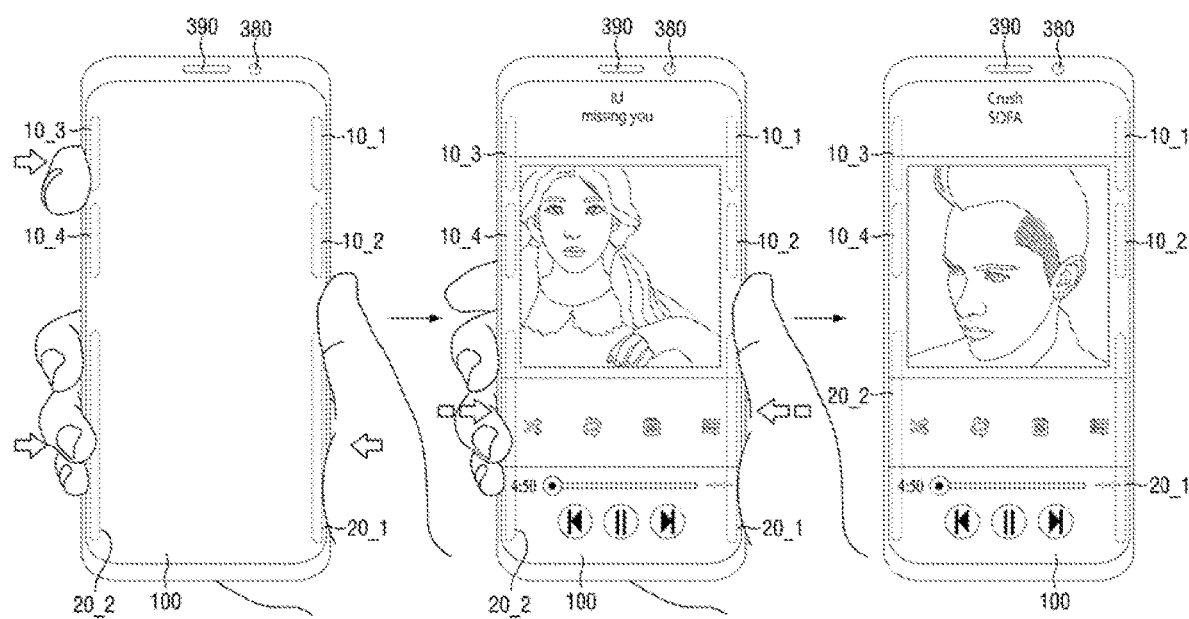

FIGS. 14A and 14B illustrate music player display screens of the mobile terminal of FIG. 13.

Referring to FIGS. 14A and 14B, according to an embodiment, the first input signal is received from one of the power key 10_1, the call key 10_2, the volume up key 10_3, or the volume down key 10_4, and at the same time, the second input signal is received from the 1o squeezing bars 20_1 and 20_2. When the first and second pressure signals exceed the predetermined pressure threshold value, the third input signal is a swipe input signal for one of the items (10 and 20) disposed in the edge areas A and B or for the squeezing bars 20_1 and 20_2, and an action of the mobile terminal 1 when the third input signal exceeds the predetermined pressure threshold value will hereinafter be described.

According to an embodiment, the user presses the volume up key 10_3 and the squeezing bars 20_1 and 20_2 at the same time, as illustrated in the left image of FIG. 14A. If a determination is made that the first input signal exceeds both the predetermined pressure threshold value and the predetermined duration threshold value, the control unit 200 detects the second input signal. If the second input signal exceeds the predetermined pressure threshold value, the control unit 200 displays a music player screen on the edge touch display 100, as illustrated in the center image of FIG. 14A.

Thereafter, in an exemplary embodiment, the user performs a swipe action on the volume up key 10_3 and the volume down key 10_4 with a finger, as illustrated in the center image of FIG. 14A. If a determination is made that the pressure of the swipe performed on the upper part of the edge area A exceeds a predetermined level, the control unit 200 raises or lowers the volume of the mobile terminal 1, depending on the location of the finger of the user. A slider that visually represents the volume level is displayed on the edge touch display 100, as illustrated in the right image of FIG. 14A. As already described above, in one exemplary embodiment, the pressure sensors 500 may allocate five channels to each of the volume up key 10_3 and the volume down key 10_4. Thus, the control unit 200 adjusts the volume of the mobile terminal 1 with a total of 10 steps in response to the user's swipe input.

In another exemplary embodiment, the user performs a swipe action on the power key 10_1 and the call key 10_2, with a finger, as illustrated in the left image of FIG. 14B. If a determination is made that the pressure of the swipe performed on the upper part of the edge area A exceeds a predetermined level, the control unit 200 can fast-forward or rewind a music item currently being played, depending on the location of the finger of the user. As already described above, in one exemplary embodiment, the pressure sensors 500 may allocate five channels to each of the power key 10_1 and the call key 10_2. Thus, the control unit 200 performs interval search with a total of 10 steps in response to the user's swipe input.

In yet another exemplary embodiment, the user squeezes both the squeezing bars 20_1 and 20_2 at the same time, as illustrated in the center image of FIG. 14B. If a determination is made that the pressure applied to the squeezing bars 20_1 and 20_2 exceeds a predetermined level, the control unit 200 jumps to a subsequent or previous music item, as illustrated in the right image of FIG. 14B. The control unit 200 determines the direction in which to jump based on the length of an input signal received from the squeezing bars 20_1 and 20_2.

Figure 15:
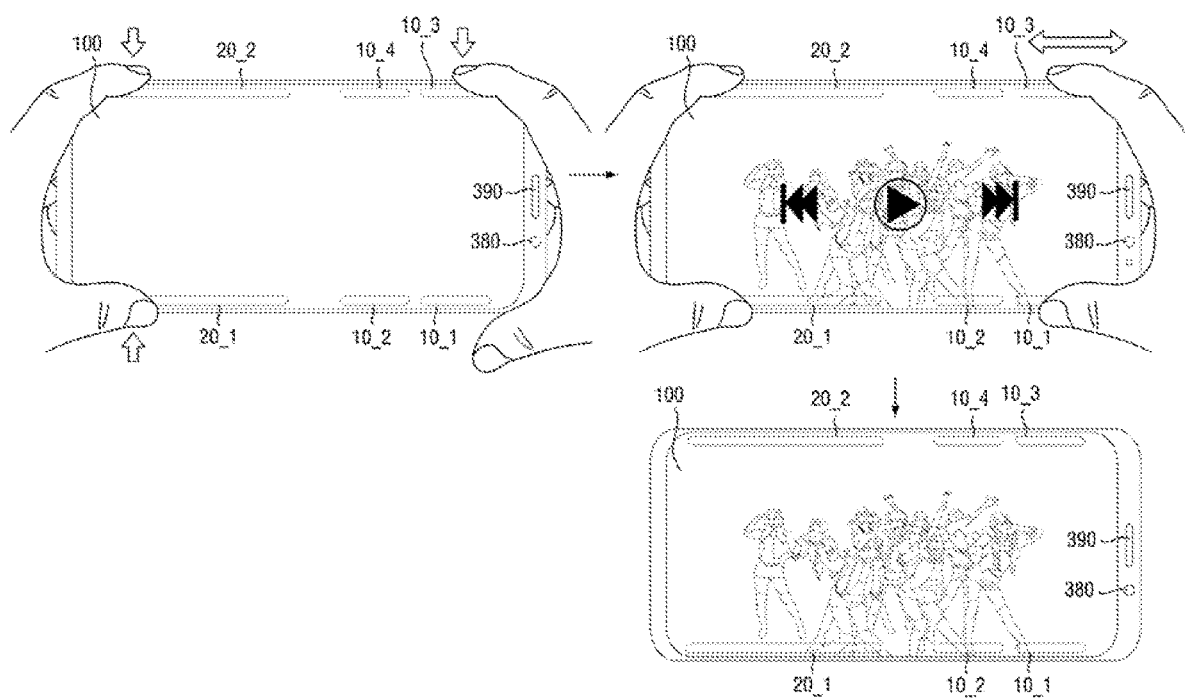
FIG. 15 illustrates video player display screens of a mobile terminal of FIG. 13.

FIG. 15 illustrates video player display screens of the mobile terminal of FIG. 13.

Referring to FIG. 15, according to an embodiment, the first input signal is received from one of the power key 10_1, the call key 10_2, the volume up key 10_3, or the volume down key 10_4, and at the same time, the second input signal is received from the squeezing bars 20_1 and 20_2, as illustrated in the left image of FIG. 15. When the first and second pressure signals exceed the predetermined pressure threshold value, the third input signal is a swipe input signal for one of the items (10 and 20) disposed in the edge areas A and B, and an action of the mobile terminal 1 when the third input signal exceeds the predetermined pressure threshold value will hereinafter be described.

According to an embodiment, the control unit 200 detects, via the motion sensing unit 400, that the mobile terminal 1 is being switched from a portrait view mode to a landscape view mode. The portrait view mode corresponds to a case where the mobile terminal 1 is oriented vertically, and the landscape view mode corresponds to a case where the mobile terminal 1 is oriented horizontally.

According to an embodiment, in response to the view mode of the mobile terminal 1 being changed, the control unit 200 recognizes the same input signals as being instructions to execute different applications. For example, as described above with reference to FIGS. 14A and 14B, the user presses the volume up key 10_3 and the squeezing bars 20_1 and 20_2 at the same time, as illustrated in the left image of FIG. 15. If a determination is made that the first input signal exceeds the predetermined pressure threshold value and lasts longer than a predetermined duration threshold value, the control unit 200 detects the second input signal. Then, if the second input signal exceeds the predetermined pressure threshold value, the control unit 200 displays a video player screen on the edge touch display 100, as illustrated in the upper right image of FIG. 15.

That is, according to an embodiment, for the same type of input from the volume up key 10_3 and the squeezing bars 20_1 and 20_2, the control unit 200 displays the music player screen in portrait view mode and displays the video player screen in landscape view mode. As a result, an intuitive user experience (UX) can be provided based on the user's use of the mobile terminal 1.

Thereafter, according to an embodiment, the user performs a swipe action on the volume up key 10_3 and the volume down key 10_4 with a finger, as illustrated in the upper right image of FIG. 15. If a determination is made that the pressure of the swipe performed on the upper part of the edge area A exceeds a predetermined level, the control unit 200 raises or lowers the volume of the mobile terminal 1, depending on the location of the finger of the user. As already described above, in one exemplary embodiment, the pressure sensors 500 allocate five channels to each of the volume up key 10_3 and the volume down key 10_4. Thus, the control unit 200 adjusts the volume of the mobile terminal 1 with a total of 10 steps in response to swipe input from the user.

In another exemplary embodiment, the user performs a swipe action on the power key 10_1 and the call key 10_2. If a determination is made that the pressure of the swipe performed on the upper part of the edge area A exceeds a predetermined level, playback icons are displayed on the edge touch display 100, as illustrated in the upper right image of FIG. 15, and the control unit 200 fast-forwards or rewinds a video item currently being played depending on the location of the finger of the user, as illustrated in the lower right image of FIG. 15. As already described above, in one exemplary embodiment, the pressure sensors 500 may allocate five channels to each of the power key 10_1 and the call key 10_2. Thus, the control unit 200 may perform interval search with a total of 10 steps in response to swipe input from the user.

Figure 16:
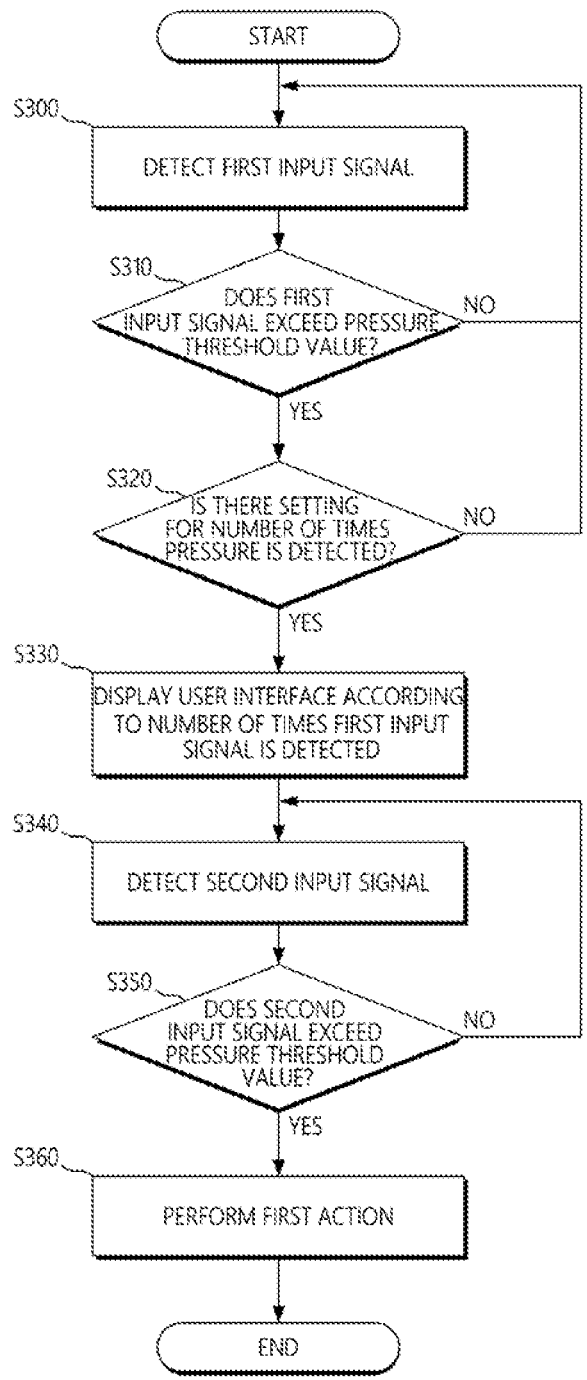
FIG. 16 is a flowchart of an action of a mobile terminal according to another exemplary embodiment of the present disclosure.

FIG. 16 is a flowchart of an action of a mobile terminal according to another exemplary embodiment of the present disclosure.

Referring to FIG. 16, according to an embodiment, the control unit 200 of the mobile terminal 1 detects a first input signal via the pressure sensors 500 (step S300). The first input signal may be a pressure signal from the user for the edge areas A and B of the edge touch display 100. For example, the first input signal is a pressure signal received from one of the power key 101, the call key 102, the volume up key 10_3, or the volume down key 10_4. In another example, the first input signal is a pressure signal generated by squeezing both the squeezing bars 20_1 and 20_2 at the same time. In one exemplary embodiment, the first input signal may be a tap, a squeeze, or a swipe and is entered at least twice in a row.

According to an embodiment, thee control unit 200 determines whether the first input signal exceeds a predetermined pressure threshold value (step S310). If the first input signal does not exceed the predetermined pressure threshold value, the control unit 200 detects a new input signal via the pressure sensors 500.

According to an embodiment, if the first input signal exceeds the predetermined pressure threshold value, the control unit 200 determines whether there are UIs set to be displayed on the edge touch display 100 based on the number of times the pressure of the first input signal is detected (step S320). In addition, if the first input signal exceeds the predetermined pressure threshold value, the control unit 200 vibrates a predetermined pattern via the haptic module 600. Accordingly, the user feels like an actual physical button is being pressed. The control unit 200 vibrates a different pattern when the items disposed in the upper parts of the edge areas A and B are pressed than when the items disposed in the lower parts of the edge areas A and B are pressed.

According to an embodiment, if there are UIs set to be displayed on the edge touch display 100 based on the number of times the pressure of the first input signal is detected, the control unit 200 displays one of the UIs on the edge touch display 100 based on the number of times the first input signal has been detected (step S330). The UI displayed in S330 corresponds to an application execution screen.

According to an embodiment, the control unit 200 detects a second input signal via the pressure sensors 500 (step S340). The second input signal is a pressure signal from the user for the edge areas A and B of the edge touch display 100. For example, the second input signal is a pressure signal for one of the power key 10_1, the call key 10_2, the volume up key 10_3, or the volume down key 10_4. In another example, the second input signal is a pressure signal generated by squeezing both the squeezing bars 20_1 and 20_2, at the same time.

According to an embodiment, the control unit 200 determines whether the second input signal exceeds the predetermined pressure threshold value (step S350). If the second pressure signal exceeds the predetermined pressure threshold value, the control unit 200 performs a first action (step S360). The first action may be a click, a drag, or a scroll for selecting or executing an action associated with one of a plurality of menu items included in the UI displayed in S330 and may vary depending on the type of the UI displayed in S330.

Figure 17:
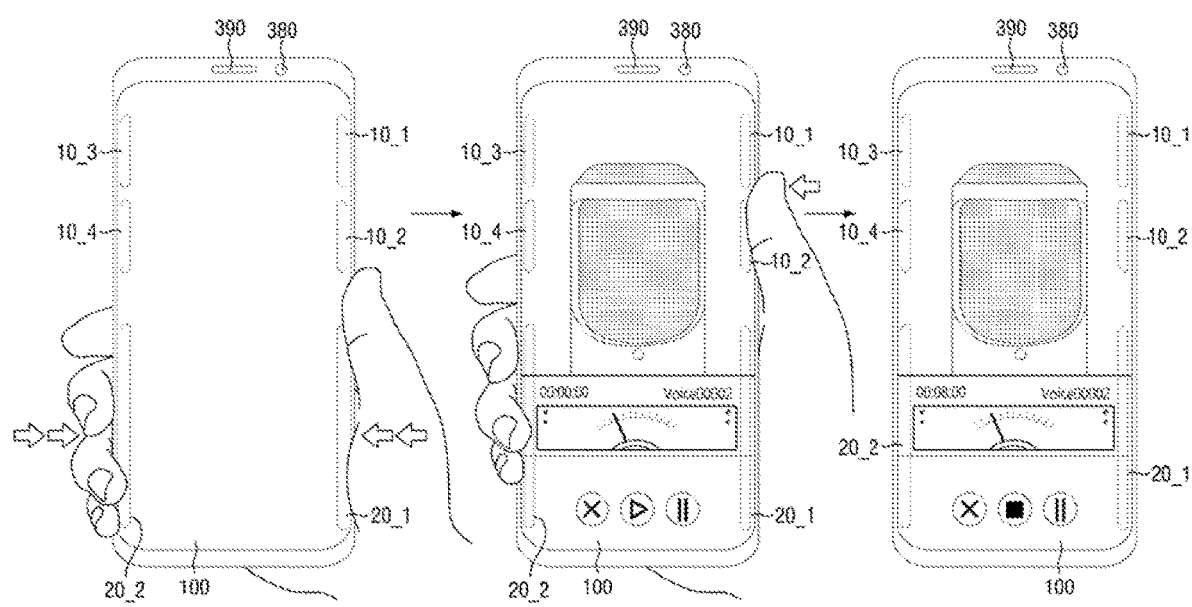
FIG. 17 illustrates audio recorder execution display screens of a mobile terminal of FIG. 16.

FIG. 17 illustrates audio recorder execution display screens of the mobile terminal of FIG. 16.

According to an embodiment, an action of the mobile terminal 1 when a first input signal that exceeds the predetermined pressure threshold value is entered twice for the squeezing bars 20_1 and 20_2, there are UIs set to be displayed on the edge touch display 100 based on the number of times the pressure of the first input signal is detected, and a second input signal that exceeds the predetermined pressure threshold value is entered for the call key 102, will hereinafter be described with reference to FIG. 17.

According to an embodiment, the user presses the squeezing bars 20_1 and 20_2 twice in a row, as illustrated in the left image of FIG. 17. If a determination is made that the first input signal exceeds the predetermined pressure threshold value and there are UIs set to be displayed on the edge touch display 100 based on the number of times the pressure of the first input signal is detected, the control unit 200 displays an audio recorder execution screen on the edge touch display 100, as illustrated in the center image of FIG. 17. The storage unit 310 stores information regarding the various types of applications set to be executed based on the number of times an input signal is entered by the user. The control unit 200 executes an application that corresponds to the number of times the first input signal has been entered based on the information stored in the storage unit 310.

Thereafter, according to an embodiment, the user presses the call key 10_2, as illustrated in the center image of FIG. 17. If a determination is made that the pressure applied to the call key 10_2 exceeds a predetermined level, the control unit 200 may execute an audio recorder function, as illustrated in the right image of FIG. 17.

Figure 18:
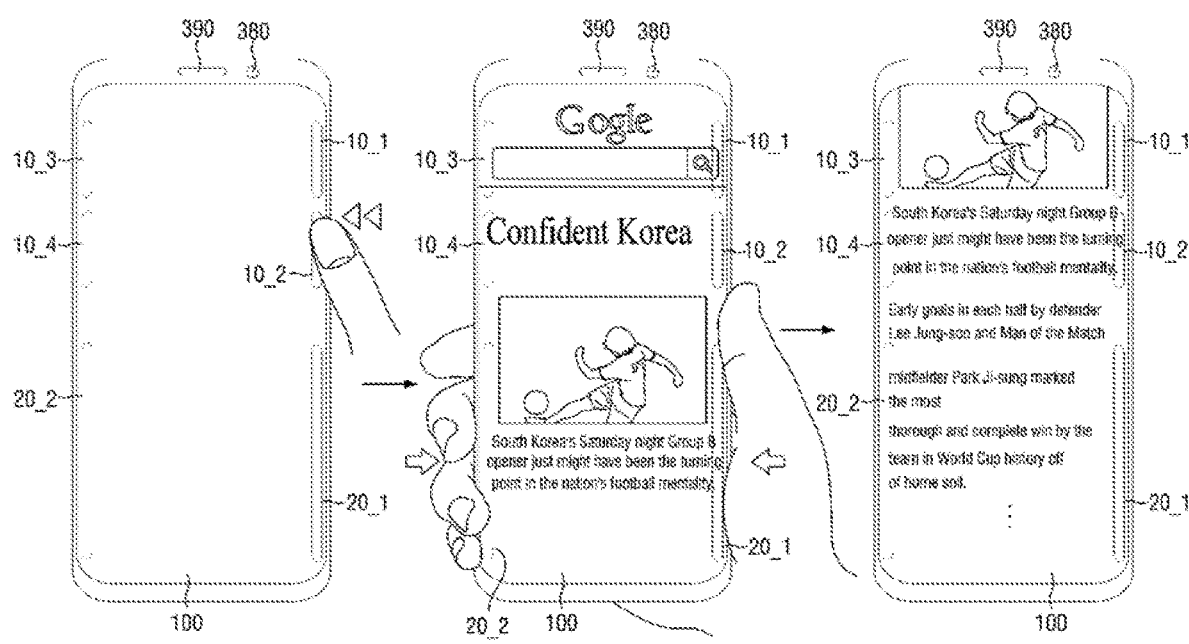
FIG. 18 illustrates Internet browser execution display screens of a mobile terminal of FIG. 16.

FIG. 18 illustrates Internet browser execution display screens of the mobile terminal of FIG. 16.

According to an embodiment, an action of the mobile terminal 1 when a first input signal that exceeds the predetermined pressure threshold value is entered twice for the call key 10_2, there are UIs set to be displayed on the edge touch display 100 based on the number of times the pressure of the first input signal is detected, and a second input signal that exceeds the predetermined pressure threshold value is entered for the squeezing bars 20_1 and 20_2, will hereinafter be described with reference to FIG. 18.

Referring to FIG. 18, according to an embodiment, the user taps the call key 10_2 twice in a row, as illustrated in the left image of FIG. 18. If a determination is made that the first input signal exceeds the predetermined pressure threshold value and there are UIs set to be displayed on the edge touch display based on the number of the pressure of the first input signal is detected, the control unit 200 displays an Internet browser execution screen on the edge touch display 100, as illustrated in the center image of FIG. 18. The storage unit 310 stores information regarding the various types of applications set to be executed based on the number of times an input signal is entered by the user. The control unit 200 executes an application that corresponds to the number of times the first input signal has been entered based on the information stored in the storage unit 310.

Thereafter, according to an embodiment, the user squeezes the squeezing bars 20 . . . 1 and 202, as illustrated in the center image of FIG. 18. If a determination is made that the pressure applied to the squeezing bars 20_1 and 20_2 exceeds a predetermined level, the control unit 200 scrolls the Internet browser execution screen displayed on the edge touch display 100, as illustrated in the right image of FIG. 18. The control unit 200 changes the direction of scrolling the Internet browser execution screen based on whether the number of times an input signal is entered for the squeezing bars 20_1 and 20_2 is an even number or an odd number. In addition, the control unit 200 increases or decreases the scrolling speed of the Internet browser execution screen based on the pressure applied to the squeezing bars 20_1 and 20_2.

Embodiments of the inventive concept of the present disclosure can be implemented as computer readable codes on a computer readable recording medium. The computer readable recording medium can be any non-transitory data storage device that can store data which can be thereafter read by a computer system. Examples of a computer readable recording medium include magnetic storage media, such as ROMs, floppy disks, hard disks, etc, and optical recording media, such as CD-ROMs or DVDs. In addition, the computer system may include the control unit 200 of the mobile terminal 1.

In concluding the detailed description, those skilled in the art will appreciate that many variations and modifications can be made to exemplary embodiments without substantially departing from the principles of the present disclosure. Therefore, the disclosed exemplary embodiments of the disclosure are used in a generic and descriptive sense only and not for purposes of limitation.

What is claimed is:

1. An electronic device, comprising:
 a touch display that includes an edge portion on at least one side thereof;
 a sensor unit that includes a first pressure sensor disposed in a first sensing area of the edge portion and a second pressure sensor disposed in a second sensing area of the edge portion; and
 a control unit that displays a first user interface associated with a first application on the touch display in response to a first input signal that exceeds a predetermined pressure value but whose duration is less than a predetermined duration threshold value being detected via at least one of the first or second pressure sensors, that performs a first action of the first application in response to a second input signal that exceeds the predetermined pressure value being detected via at least one of the first or second pressure sensors, and displays a second user interface associated with a second application on the touch display, when the first input signal exceeds the predetermined duration threshold value.

2. The electronic device of claim 1, wherein
 the touch display includes the edge portion on both sides thereof,
 the first pressure sensor is disposed as at least two pairs of segments that face the first sensing area, and
 the second pressure sensor is disposed as at least one pair of segments that face the second sensing area.

3. The electronic device of claim 2, wherein a length of the segments disposed in the second sensing area is greater than a length of the segments disposed in the first sensing area.

4. The electronic device of claim 2, wherein the control unit displays a plurality of items in the first sensing area, and the items overlap the segments disposed in the first sensing area.

5. The electronic device of claim 4, further comprising:
 a haptic module, wherein the control unit provides a predetermined vibration in response to pressure that exceeds a predetermined level being applied to the items in the first sensing area.

6. The electronic device of claim 4, wherein
 each of the plurality of items correspond to an application that is executable, and
 the control unit determines items to be displayed in at least one of the first or second sensing areas in response to an input from a user.

7. The electronic device of claim 1, wherein each of the first or second input signals is one of a tap, a swipe, or a squeeze performed on the edge portion.

8. The electronic device of claim 1, wherein the first user interface is an application execution screen for at least one of a camera application, a phone application, an email application, a messages application, a music player application, a video player application, an alarm setting application, a flashlight application, or an Internet browser application.

9. The electronic device of claim 8,
 wherein the first user interface includes a menu, and
 wherein the first action is one of a click, a drag, or a scroll for executing an action associated with an item of the menu.

10. The electronic device of claim 1, wherein the touch display further includes
 a main area on a front surface thereof, and
 a surface that includes the edge portion and a surface that includes the main area form an obtuse angle with each other.

11. The electronic device of claim 1, further comprising:
 a motion sensing unit, wherein the control unit determines whether the electronic device is in a portrait view mode or in a landscape view mode via the motion sensing unit and displays the first user interface on the touch display in different orientations depending on the view mode of the electronic device, in response to the first input signal being detected by the sensor unit.

12. An electronic device, comprising:
a touch display that includes a first edge portion on a first side thereof, and a second edge portion on a second side opposite from the first side;
a sensor unit that includes a first pressure sensor disposed in a first sensing area in the first edge portion and a second pressure sensor disposed in a second sensing area in the second edge portion, wherein the first pressure sensor is disposed as at least two pairs of segments that face the first sensing area, and the second pressure sensor is disposed as at least one pair of segments that face the second sensing area a length of the segments disposed in the second sensing area is greater than a length of the segments disposed in the first sensing area; and
a control unit that displays a first user interface on the touch display in response to a first input signal that exceeds a predetermined pressure value and a second input signal that exceeds the predetermined pressure value being detected at the same time via the first and second pressure sensors, respectively, and that performs a first action in response to a third input signal received by the first user interface that exceeds the predetermined pressure value being detected via at least one of the first or second pressure sensors.

13. The electronic device of claim 12, wherein the control unit displays a plurality of items in at least one of the first or second sensing areas, and the items overlap the segments disposed in, the first sensing area or the segments disposed in the second sensing area.

14. An electronic device comprising:
a storage unit;
a touch display that includes an edge portion on both sides thereof;
a sensor unit that includes a first pressure sensor disposed in a first sensing area of the edge portion and a second pressure sensor disposed in a second sensing area of the edge portion; and
a control unit that searches for and finds a first user interface that corresponds to a number of times a first input signal that exceeds a predetermined pressure value is detected by the sensor unit, and that displays the first user interface in response to the first input signal being detected by the sensor unit, and that performs a first action in response to a second input signal that exceeds the predetermined pressure value being detected via at least one of the first or second pressure sensors.

15. The electronic device of claim 14, wherein
the first pressure sensor is disposed as at least two pairs of segments that face the first sensing area, and
the second pressure sensor is disposed as at least one pair of segments that face the second sensing area.

16. The electronic device of claim 15, wherein a length of the segments disposed in the second sensing area is greater than a length of the segments disposed in the first sensing area.

17. The electronic device of claim 15, wherein the control unit displays a plurality of items in at least one of the first or second sensing areas, and the items overlap the segments disposed in the first sensing area or the segments disposed in the second area.

* * * * *